(12) United States Patent
Bai

(10) Patent No.: US 11,966,592 B1
(45) Date of Patent: Apr. 23, 2024

(54) IN-PLACE ERASURE CODE TRANSCODING FOR DISTRIBUTED FILE SYSTEMS

(71) Applicant: Qumulo, Inc., Seattle, WA (US)

(72) Inventor: Yuxi Bai, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 18/070,705

(22) Filed: Nov. 29, 2022

(51) Int. Cl.
*G06F 3/06* (2006.01)
(52) U.S. Cl.
CPC .......... *G06F 3/0619* (2013.01); *G06F 3/0631* (2013.01); *G06F 3/064* (2013.01); *G06F 3/0644* (2013.01); *G06F 3/067* (2013.01)
(58) Field of Classification Search
CPC ...... G06F 3/0619; G06F 3/0644; G06F 3/067; G06F 3/064; G06F 3/0631
See application file for complete search history.

(56) References Cited

U.S. PATENT DOCUMENTS

| | | | |
|---|---|---|---|
| 5,165,031 A | 11/1992 | Pruul et al. |
| 5,283,875 A | 2/1994 | Gibson et al. |
| 5,319,773 A | 6/1994 | Britton et al. |
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |

(Continued)

FOREIGN PATENT DOCUMENTS

| EP | 1217551 A2 | 6/2002 |
|---|---|---|
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Mark A Giardino, Jr.
(74) *Attorney, Agent, or Firm* — John W. Branch; Branch Partners PLLC

(57) ABSTRACT

Embodiments are directed to in-place erasure code transcoding for distributed file systems. A file system may be divided into a first partition associated with a first erasure code and a second partition second partition is associated with a second erasure code. If the second partition has sufficient storage space to store protection groups further actions may be performed, including: determining block stores in the first partition associated with the protection groups; transcoding contents of the block stores into other block stores based on the second erasure code; storing the other block stores in the second partition; deleting the block stores from the first partition; shifting another portion of the storage space from the first partition to the second partition such that the shifted other portion increases a size of the second partition to provide sufficient storage space for other protection groups; or the like.

24 Claims, 14 Drawing Sheets

(56) References Cited

U.S. PATENT DOCUMENTS

| | | |
|---|---|---|
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 * | 6/2011 | Goel .................. G06F 11/1096 711/170 |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 * | 4/2020 | Tripathi .................. G06F 3/0644 |
| 10,621,147 B1 | 4/2020 | Liang et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 * | 10/2021 | Gao ...................... G06F 3/0632 |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |

(56) References Cited

U.S. PATENT DOCUMENTS

| | | |
|---|---|---|
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1* | 8/2005 | Land .................. G06F 3/0632 714/701 |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1* | 12/2011 | Sullivan .............. G06F 13/409 348/E7.003 |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |

(56) References Cited

U.S. PATENT DOCUMENTS

| | | |
|---|---|---|
| 2015/0186527 A1 | 7/2015 | Rao et al. |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1* | 4/2022 | Hua ............... G06F 11/1076 |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |

FOREIGN PATENT DOCUMENTS

| | | |
|---|---|---|
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 1999044145 A1 | 9/1999 |
| WO | 0072201 A1 | 11/2000 |
| WO | 2009007250 A2 | 1/2009 |
| WO | 2012029259 A1 | 3/2012 |
| WO | 2016/205752 A1 | 12/2016 |

(56) References Cited

FOREIGN PATENT DOCUMENTS

WO 2021/151107 A1 7/2021
WO 2021/189055 A2 9/2021

OTHER PUBLICATIONS

Office Communication for U.S. Appl. No. 16/228,716 dated Jun. 24, 2019, pp. 1-10.
Office Communication for U.S. Appl. No. 16/231,354 dated Jul. 10, 2019, pp. 1-8.
Office Communication for U.S. Appl. No. 16/262,756 dated Aug. 5, 2019, pp. 1-35.
Office Communication for U.S. Appl. No. 15/967,499 dated Jun. 27, 2018, pp. 1-16.
Office Communication for U.S. Appl. No. 16/226,587 dated Feb. 25, 2019, pp. 1-43.
Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,790 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes, Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communication for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated May 6, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, nj, usa, IEEE, XP010541274, ISBN: 978-0-7695-1092-7, pp. 36-42.

(56) References Cited

OTHER PUBLICATIONS

Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 28, 2020, pp. 1-21.
Office Communication for U.S. Appl. No. 16/434,157 dated Jan. 29, 2020, pp. 1-9.
Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Examination Report for European Patent Application No. 16812585.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020, pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 28, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.

(56) References Cited

OTHER PUBLICATIONS

Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.
Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,384 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 28, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 17/504,289 dated Dec. 7, 2021, pp. 1-15.
Office Communication for U.S. Appl. No. 17/114,384 dated Dec. 14, 2021, pp. 1-7.
Office Communication for U.S. Appl. No. 17/190,653 dated Dec. 21, 2021, pp. 1-12.
Office Communication for U.S. Appl. No. 17/508,869 dated Dec. 22, 2021, pp. 1-9.
Office Communication for U.S. Appl. No. 17/491,017 dated Dec. 23, 2021, pp. 1-41.
Office Communication for U.S. Appl. No. 14/595,598 dated Dec. 29, 2021, pp. 1-19.
Office Communication for U.S. Appl. No. 17/062,500 dated Jan. 7, 2022, pp. 1-4.
Office Communication for U.S. Appl. No. 16/741,567 dated Jan. 11, 2022, pp. 1-6.
Office Communication for U.S. Appl. No. 17/203,452 dated Jan. 14, 2022, pp. 1-4.
Office Communication for U.S. Appl. No. 17/510,043 dated Jan. 21, 2022, pp. 1-13.
Office Communication for U.S. Appl. No. 16/741,567 dated Feb. 7, 2022, pp. 1-8.
Office Communication for U.S. Appl. No. 17/530,420 dated Feb. 10, 2022, pp. 1-24.
Office Communication for U.S. Appl. No. 16/004,182 dated Feb. 18, 2022, pp. 1-11.
Office Communication for U.S. Appl. No. 17/115,529 dated Feb. 18, 2022, pp. 1-20.
Office Communication for U.S. Appl. No. 17/203,452 dated Feb. 24, 2022, pp. 1-14.
Office Communication for U.S. Appl. No. 17/484,167 dated Mar. 11, 2022, pp. 1-11.
Office Communication for U.S. Appl. No. 17/062,500 dated Mar. 22, 2022, pp. 1-19.
Office Communication for U.S. Appl. No. 17/504,289 dated Mar. 28, 2022, pp. 1-9.
Office Communication for U.S. Appl. No. 17/588,120 dated Apr. 11, 2022, pp. 1-36.
Office Communication for U.S. Appl. No. 17/588,895 dated Apr. 27, 2022, pp. 1-6.
Office Communication for U.S. Appl. No. 17/190,653 dated Apr. 28, 2022, pp. 1-13.
Office Communication for U.S. Appl. No. 17/510,043 dated Apr. 29, 2022, pp. 1-10.
Office Communication for U.S. Appl. No. 17/115,529 dated Apr. 29, 2022, pp. 1-4.
Office Communication for U.S. Appl. No. 17/491,017 dated May 12, 2022, pp. 1-50.
Office Communication for U.S. Appl. No. 17/484,167 dated May 17, 2022, pp. 1-3.
Office Communication for U.S. Appl. No. 17/484,167 dated Jun. 10, 2022, pp. 1-5.
Office Communication for U.S. Appl. No. 17/203,452 dated Jun. 22, 2022, pp. 1-22.
Office Communication for U.S. Appl. No. 14/595,598 dated Jul. 13, 2022, pp. 1-9.
Office Communication for U.S. Appl. No. 17/062,500 dated Jul. 26, 2022, pp. 1-20.
Office Communication for U.S. Appl. No. 17/588,120 dated Jul. 27, 2022, pp. 1-34.
Office Communication for U.S. Appl. No. 17/190,653 dated Aug. 2, 2022, pp. 1-8.
Office Communication for U.S. Appl. No. 17/115,529 dated Aug. 8, 2022, pp. 1-21.
Office Communication for U.S. Appl. No. 17/588,895 dated Aug. 12, 2022, pp. 1-12.
Office Communication for U.S. Appl. No. 17/491,017 dated Aug. 17, 2022, pp. 1-5.
Office Communication for U.S. Appl. No. 17/203,452 dated Sep. 8, 2022, pp. 1-4.
Office Communication for U.S. Appl. No. 17/491,017 dated Sep. 15, 2022, pp. 1-55.
Office Communication for U.S. Appl. No. 17/864,190 dated Sep. 19, 2022, pp. 1-10.
Office Communication for U.S. Appl. No. 17/062,500 dated Oct. 5, 2022, pp. 1-4.
Office Communication for U.S. Appl. No. 17/203,452 dated Oct. 19, 2022, pp. 1-9.

(56) References Cited

OTHER PUBLICATIONS

Office Communication for U.S. Appl. No. 17/588,120 dated Oct. 21, 2022, pp. 1-5.
Office Communication for U.S. Appl. No. 17/203,452 dated Nov. 9, 2022, pp. 1-2.
Office Communication for U.S. Appl. No. 17/588,895 dated Nov. 9, 2022, pp. 1-11.
Office Communication for U.S. Appl. No. 17/954,640 dated Nov. 30, 2022, pp. 1-10.
Office Communication for U.S. Appl. No. 17/115,529 dated Dec. 9, 2022, pp. 1-21.
Office Communication for U.S. Appl. No. 17/864,190 dated Jan. 24, 2023, pp. 1-12.
Office Communication for U.S. Appl. No. 17/588,120 dated Feb. 1, 2023, pp. 1-15.
Office Communication for U.S. Appl. No. 17/491,017 dated Feb. 10, 2023, pp. 1-57.
Office Communication for U.S. Appl. No. 17/062,500 dated Feb. 27, 2023, pp. 1-23.
Office Communication for U.S. Appl. No. 17/954,640 dated Mar. 15, 2023, pp. 1-9.
Office Communication for U.S. Appl. No. 17/864,190 dated Apr. 28, 2023, pp. 1-5.
Office Communication for U.S. Appl. No. 17/491,017 dated May 4, 2023, pp. 1-6.
Office Communication for U.S. Appl. No. 17/973,944 dated May 10, 2023, pp. 1-9.
Office Communication for U.S. Appl. No. 17/115,529 dated May 22, 2023, pp. 1-25.
Office Communication for U.S. Appl. No. 17/115,529 dated Dec. 13, 2023, 4 Pages.
Office Communication for U.S. Appl. No. 17/115,529 dated Jan. 12, 2024, 26 Pages.
Office Communication for U.S. Appl. No. 18/503,791 dated Jan. 4, 2024, 27 Pages.
Office Communication for U.S. Appl. No. 16/152,277 dated Oct. 26, 2021, 2 Pages.
Office Communication for U.S. Appl. No. 17/062,500 dated Jun. 13, 2023, 8 Pages.
Office Communication for U.S. Appl. No. 16/004,182 dated Mar. 17, 2022, 3 Pages.
Office Communication for U.S. Appl. No. 17/491,017 dated Aug. 8, 2023, 13 Pages.
Office Communication for U.S. Appl. No. 14/595,598 dated May 16, 2019, 18 Pages.
Office Communication for U.S. Appl. No. 16/226,587 dated Jan. 27, 2020, 13 Pages.
Office Communication for U.S. Appl. No. 16/741,567 dated Feb. 24, 2022, 2 Pages.
Office Communication for U.S. Appl. No. 16/262,790 dated Nov. 8, 2019, 5 Pages.
Office Communication for U.S. Appl. No. 17/504,289 dated Apr. 20, 2022, 2 Pages.
Office Communication for U.S. Appl. No. 16/659,488 dated May 6, 2020, 8 Pages.
International Preliminary Report on Patentability Chapter I for International Patent Application No. PCT/US2021/023531 dated Aug. 4, 2022, 5 Pages.
International Preliminary Report on Patentability Chapter I for International Patent Application No. PCT/US2021/023525 dated Aug. 4, 2022, 5 Pages.
International Preliminary Report on Patentability Chapter I for International Patent Application No. PCT/US2016/038242 dated Dec. 28, 2017, 8 Pages.
Office Action for European Patent Application No. 17206518.7 dated Mar. 15, 2022, 5 Pages.
Intention to Grant for European Patent Application No. 17206518.7 dated Sep. 30, 2022, 6 Pages.
Office Communication for U.S. Appl. No. 17/508,869 dated Mar. 8, 2022, 2 Pages.
Office Communication for U.S. Appl. No. 17/508,869 dated Jan. 5, 2022, 3 Pages.
Office Communication for U.S. Appl. No. 17/530,420 dated May 4, 2022, 3 Pages.
Office Communication for U.S. Appl. No. 17/530,420 dated May 12, 2022, 3 Pages.
Office Communication for European Patent Application No. 16812585.4 dated Apr. 1, 2021, 9 pages.
Intention to Grant for European Patent Application No. 18155779.4 dated Jun. 12, 2020, 10 Pages.
Office Communication for U.S. Appl. No. 17/115,529 dated Sep. 12, 2023, 25 Pages.
Office Communication for U.S. Appl. No. 17/864,190 dated Aug. 25, 2023, 12 Pages.
Office Communication for U.S. Appl. No. 17/864,190 dated Nov. 17, 2023, 12 Pages.
Office Communication for European Patent Application No. 18155779.4 dated Apr. 17, 2018, 4 Pages.
Office Communication for U.S. Appl. No. 17/864,190 dated Feb. 8, 2024, 5 Pages.
Office Communication for U.S. Appl. No. 18/503,918 dated Jan. 24, 2024, 12 Pages.
Office Communication for U.S. Appl. No. 18/503,918 dated Jan. 31, 2024, 8 Pages.

* cited by examiner

IN-PLACE ERASURE CODE TRANSCODING FOR DISTRIBUTED FILE SYSTEMS

TECHNICAL FIELD

The present invention relates generally to file systems, and more particularly, but not exclusively, to in-place erasure code transcoding for distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may include many storage volumes that may be subject to failure. Having a large number of storage volumes storing critical/important information may increase the likelihood that a storage volume may fail or otherwise become unavailable. Accordingly, distributed file systems may employ various parity or protection schemes to mitigate inevitable storage volume unavailability/failure. However, the large capacity and dynamic flexibility of distributed file system introduces various difficulties associated with maintaining protection/parity of data stored in file systems. For example, expanding file system capacity may disrupt existing protection schemes. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6 illustrates a logical schematic of a file system for in-place erasure code transcoding for distributed file systems in accordance with one or more of the various embodiments;

FIG. 7A illustrates a logical schematic of a file system for in-place erasure code transcoding for distributed file systems in accordance with one or more of the various embodiments;

FIG. 7B illustrates a logical schematic of a file system for in-place erasure code transcoding for distributed file systems in accordance with one or more of the various embodiments;

FIG. 7C illustrates a logical schematic of a file system for in-place erasure code transcoding for distributed file systems in accordance with one or more of the various embodiments;

FIG. 7D illustrates a logical schematic of a file system for in-place erasure code transcoding for distributed file systems in accordance with one or more of the various embodiments;

DETAILED DESCRIPTION OF VARIOUS EMBODIMENTS

Figure 1:
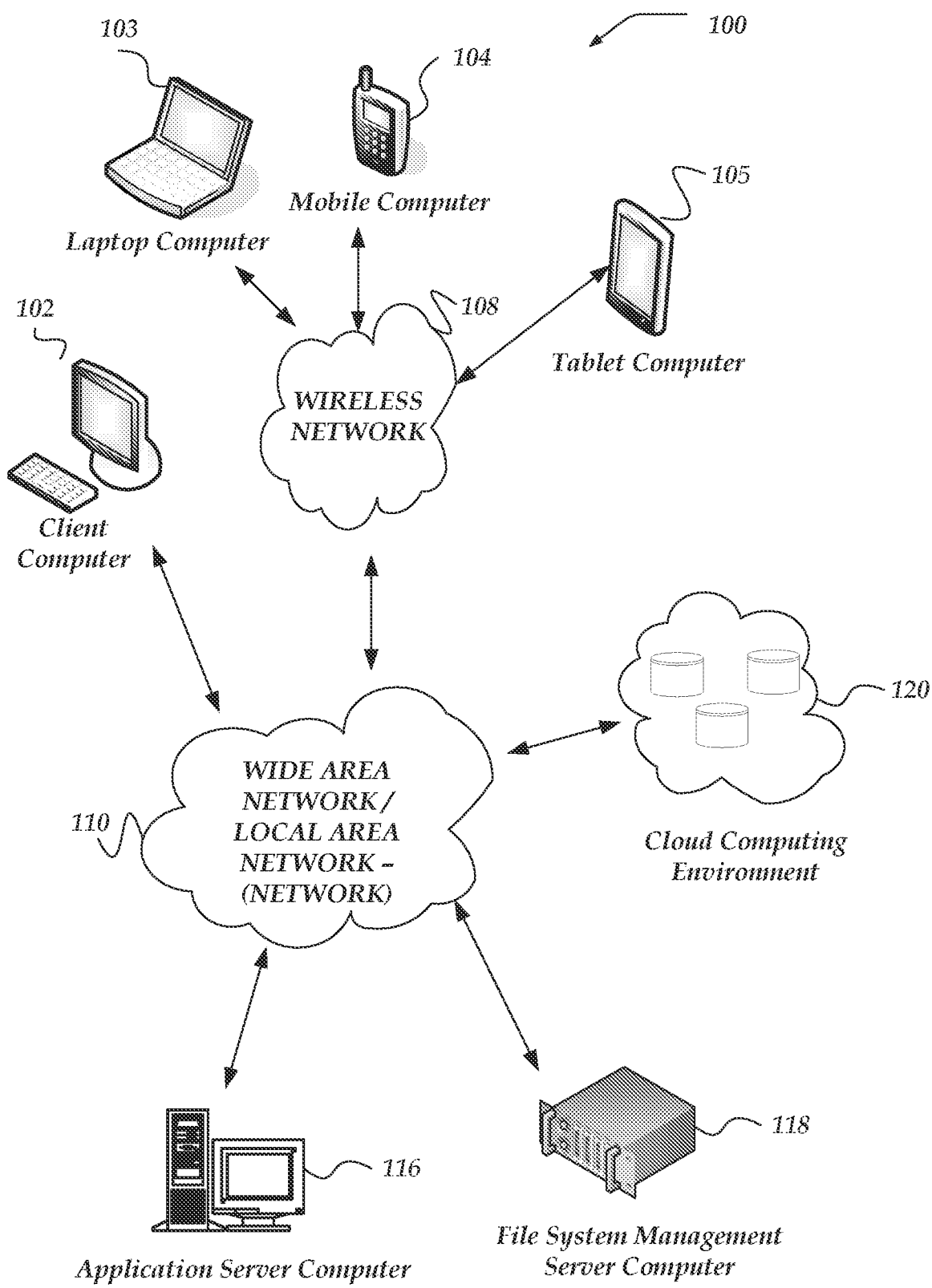
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VB Script, Microsoft .NET™ languages such as C #, or the like.

An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the term "file system block" refers to a smallest relocatable file system object. Usually, file system blocks have a fixed size based on the attributes of the underlying storage devices. Other larger file system objects are comprised of file system blocks. For example, small sized file system objects, such as, directory objects or small files may be comprised of a single block. Whereas larger file system objects, such as large document files may be comprised of many blocks. Blocks usually are arranged to have a fixed size. This may include fixing block size to a particular size, such as 4 KB, or the like, based on requirements associated with underlying storage hardware, such as, solid state drives (SSDs) or hard disk drives (HDDs), or the like. However, normal file system objects, such as, files may be of various sizes, comprised of the number of blocks necessary to represent or contain the entire file system object.

As used herein the term "storage device" as used herein refers to various apparatus for storing digital information, generally for use by computers. Storage devices may be fixed or removable non-volatile memory systems, such as, magnetic hard drives, magnetic tape, optical drives, solid state drives (SSD), flash memory storage, or the like. Typically, one or more storage devices may be arranged to store information for use in a computer system. Further, in some cases, storage devices may be virtualized such that they may be comprised of more than one storage device, storage device partition, cloud-computing object stores, cloud-computing data stores, or the like.

As used herein the term "protection level" refers to the number of simultaneous data failures a storage system may experience before data may be irrevocably lost.

As used herein the terms "erasure code," or "erasure coding" refer to methods for error correction/error recovery based on computing repair information from storage information. The repair symbol information may be computed and stored separately from the storage information and may be employed to correct errors in the storage information that may be caused by data failure. Likewise, if the repair symbol information is lost because of a storage failure, it may be recomputed from the storage information. Unless data the amount of data failures exceed the protection level afforded by the erasure coding.

As used herein the term "data failure," or "storage failure" refer to any system or device failure that causes data stored in a file system to be corrupted, lost, involuntarily deleted, or otherwise damaged such that the data is unreadable or involuntarily modified. For example, if a file system includes ten storage devices, the physical failure (breakdown) of one or more of the storage devices may be classified as a storage failure or data failure, since the information stored on the failed storage device may be inaccessible.

As used herein the term "data loss" refers to data failures that cannot be repaired. For example, if the number of data failures exceeds the file system protection level, the data failures will result in data loss. In contrast, if the number of data failures is less than or equal to the protection level, data failures may be repaired.

As used herein the terms "repair," or re-protect refer to actions performed to recover from one or more data failures in a file system. If erasure coding is being employed, a repair may include reading repair symbol information or storage data from one or more storage devices and computing lost data using one or more erasure coding algorithms.

As used herein the term "block store" refers to a collection of file system blocks that may be stored on a storage device. Each block store may include many file system blocks.

As used herein the term "protection group" refers to a collection of associated block stores. Protection groups may be associated with a protection level based on erasure coding applied to the protection group. Generally speaking if a protection group has a protection level two data failure associated with one or more block stores in the protection group may be recoverable. If the number of failed block stores exceed a protection groups, protection level, data loss may occur. File systems may distribute the block stores for a given protection group across a cluster of file system nodes or storage devices.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to in-place erasure code transcoding for distributed file systems. In one or more of the various embodiments, a file system that includes a plurality of protection groups that each are associated with a plurality of block stores may be provided such that each block store associated with the plurality of protection groups may be encoded based on a first erasure code.

In one or more of the various embodiments, the file system may be divided into a first partition and a second partition such that a portion of a storage space in the file system may be shifted from the first partition to the second partition such that the first partition may be associated with the first erasure code and the second partition is associated with a second erasure code.

In one or more of the various embodiments, in response to the second partition having sufficient storage space to store one or more protection groups further actions may be performed, including: determining one or more block stores in the first partition associated with the one or more protection groups; transcoding contents of the one or more block stores into one or more other block stores based on the second erasure code such that the one or more other block stores are sized based on the second erasure code; storing the one or more other block stores in the second partition; deleting the one or more block stores from the first partition; shifting another portion of the storage space from the first partition to the second partition such that the shifted other portion increases a size of the second partition to provide sufficient storage space for one or more other protection groups; or the like.

In one or more of the various embodiments, in response to the second partition reaching a maximum size, reporting that the file system is encoded based on the second erasure code.

In one or more of the various embodiments, one or more client requests to the file system may be provided. In some embodiments, the one or more client requests may be satisfied using contents from one or more of the first partition or the second partition.

In one or more of the various embodiments, a portion of plurality of the block stores in the first partition may be moved to provide storage space for the second.

In one or more of the various embodiments, in response to one or more storage devices being added to the file system, a portion of the plurality of block stores may be distributed to the one or more added storage devices to provide working space in the file system to transcode the plurality of block stores based on the second erasure code.

In one or more of the various embodiments, transcoding the contents of the one or more block stores into one or more other block stores may include: disassociating the one or more block stores from the one or more protection groups; associating the one or more other block stores with the one or more protection groups such that a storage capacity, protection level, or availability of each of the one or more protection groups remains unchanged; or the like.

In one or more of the various embodiments, in response to modifying the file system with one or more additional storage devices additional actions may be performed, including: determining a storage inefficiency value for the modified file system based on the first erasure code; determining a data loss risk value for the modified file system based on the first erasure code; in response to one or more of the storage inefficiency value or the data loss risk value exceeding a threshold value, converting the modified file system to protect its contents based on the second erasure code; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, cloud computing environment 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, cloud computing environment 120, or other computers.

Client computers 102-105 may further be configured to include a client application that enables an end-user to log into an end-user account that may be managed by another computer, such as application server computer 116, file system management server computer 118, cloud computing environment 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, cloud computing environment 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, cloud computing environment 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In some embodiments, cloud computing environment 120 may be one or more public or private cloud computing environments. In some embodiments, cloud computing environments may be provided by various vendors or developed internally or privately. Cloud computing environments typically provide virtualized network computers (e.g., compute instances), virtualized storage (e.g., storage volumes), virtualized network interfaces, or the like. Various cloud computing environments may be assumed to have one or more APIs or interfaces that enable users or services to provision resources, provision storage, configure networking, monitoring usage/status, or the like. One of ordinary skill in the art will be well acquainted with public or private cloud computing environments.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks, such as, cloud computing environment 120. Accordingly, these innovations and embodiments are not to be construed as being limited to a single environment, and other configurations, and other architectures are also envisaged.

Illustrative Client Computer

Figure 2:
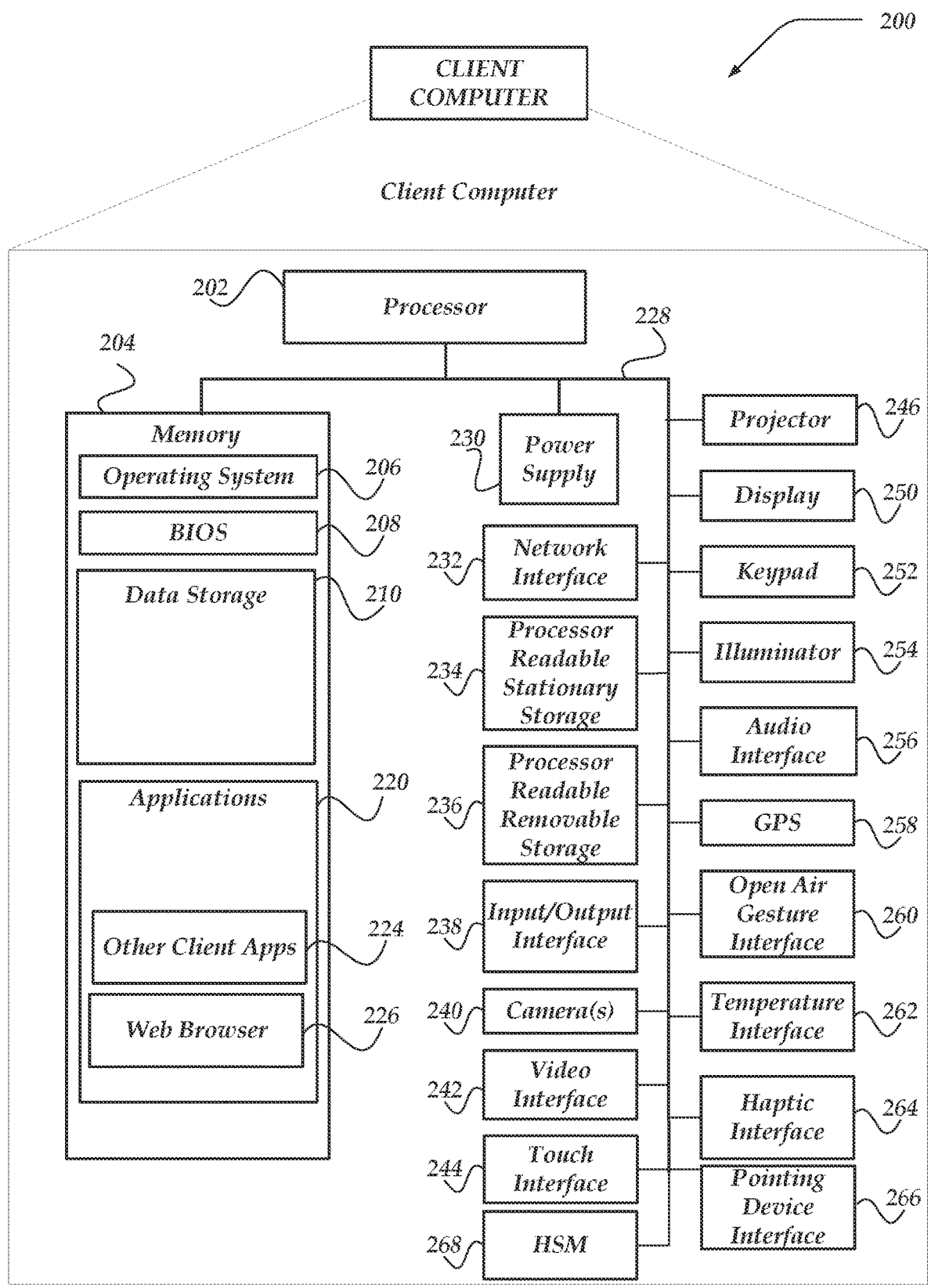
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in data objects, file system meta-data, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include other client applications 224, web browser 226, or the like. Client computers may be arranged to exchange communications one or more servers or one or more other client computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
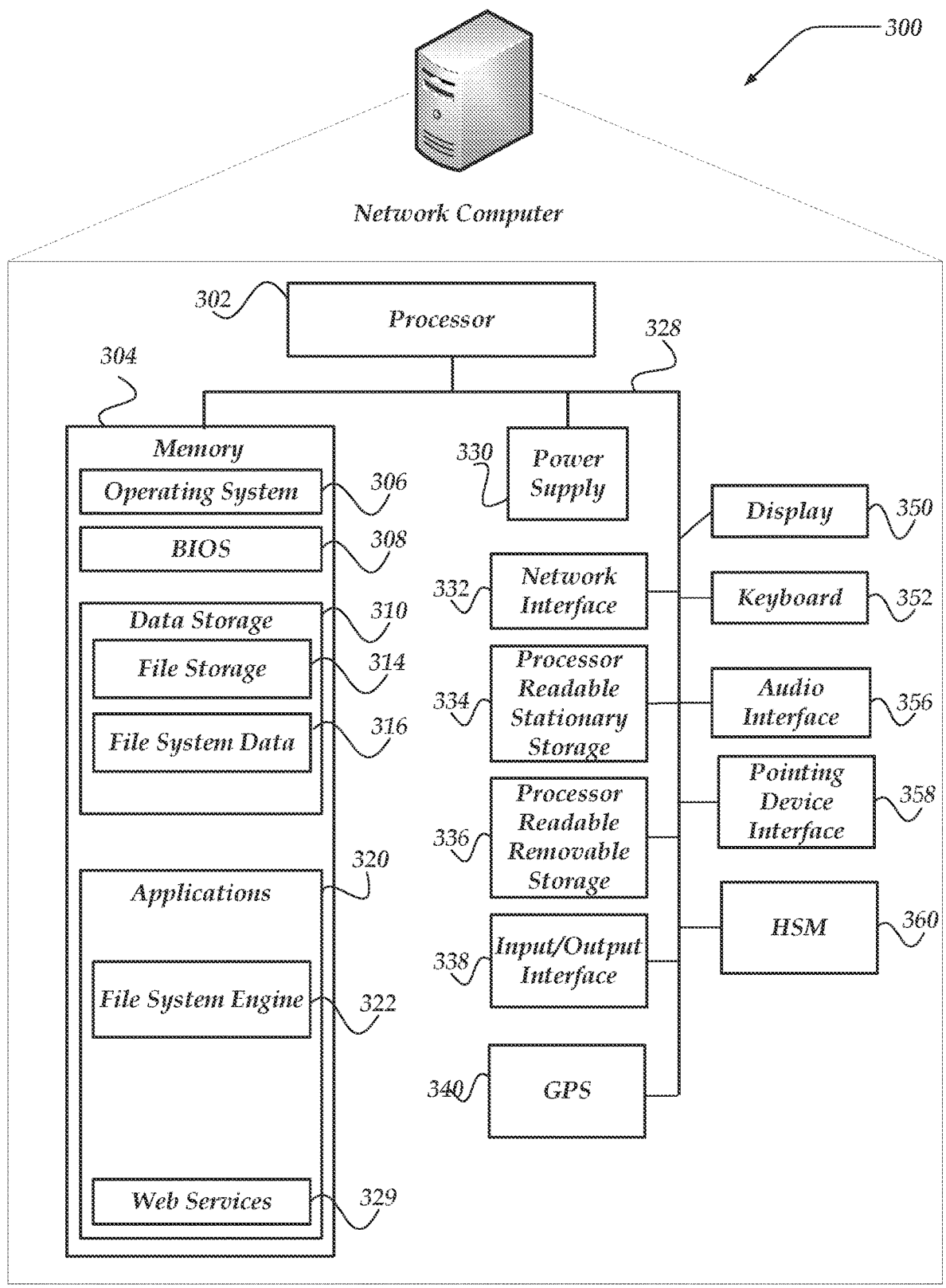
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1. Also, in some embodiments, network computer 300 may represent virtualized network computers in cloud computing environments, or the like.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
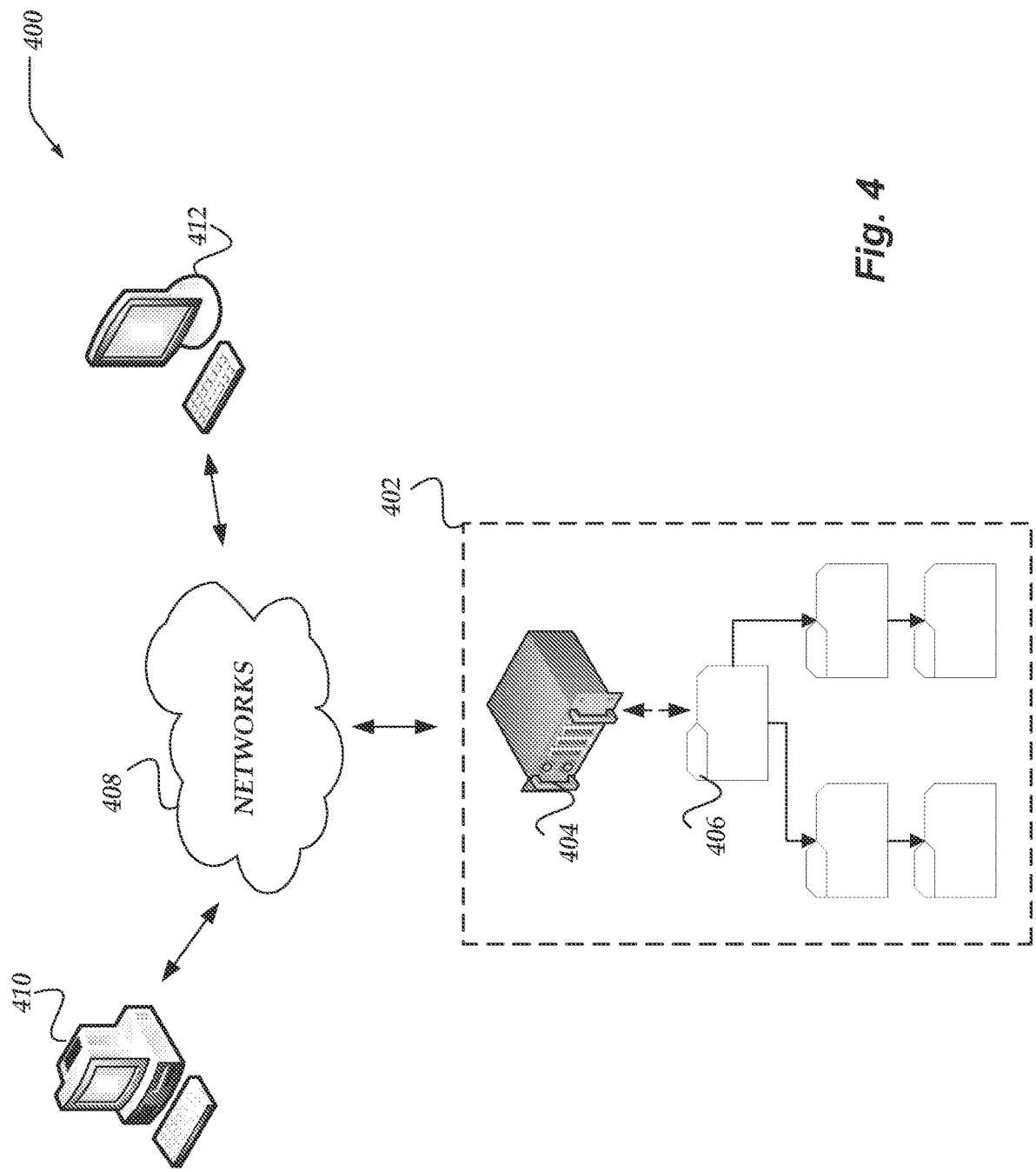
FIG. 4 illustrates a logical architecture of a system for in-place erasure code transcoding for distributed file systems in accordance with one or more of the various embodiments.

FIG. 4 illustrates a logical architecture of system 400 for in-place erasure code transcoding for distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include files, documents, directories, folders, backups, snapshots, replication snapshots, replication information, or the like.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system because file system engines may be arranged to mimic the interface or behavior of one or more conventional file systems.

Also, while file system 402 is illustrated as using one file system management computer with one set of file system objects, these innovations are not so limited. Innovations herein contemplate file systems that may include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
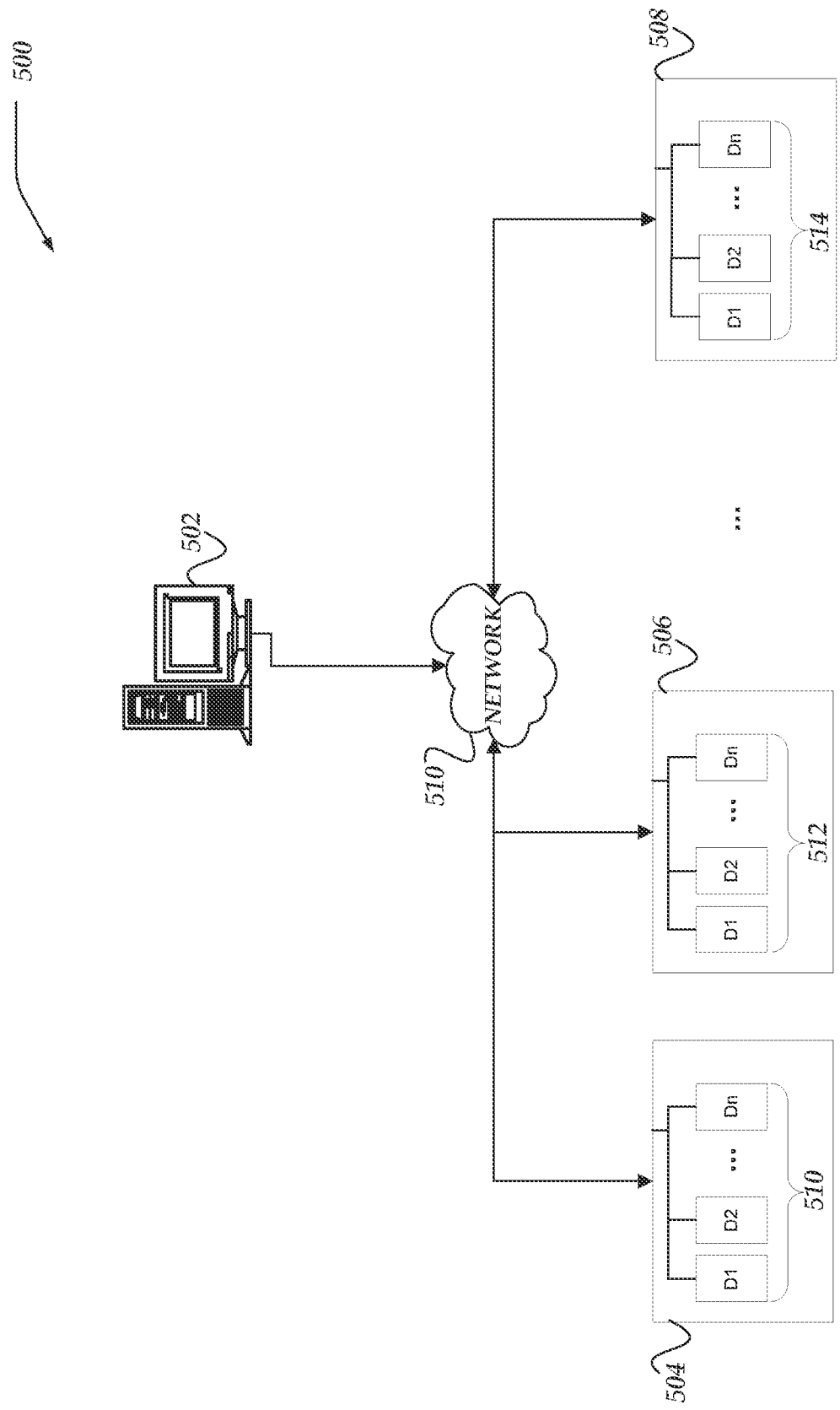
FIG. 5 shows a logical schematic of a system that is a portion of a data storage system for in-place erasure code transcoding for distributed file systems in accordance with at least one of the various embodiments.

FIG. 5 shows a logical schematic of system 500 that is a portion of a data storage system for in-place erasure code transcoding for distributed file systems in accordance with at least one of the various embodiments. In at least one of the various embodiments, system 500 may be comprised of a file system management server computer, such as, file system management server computer 502, as well as, one or more storage computers, such as, storage node 504, storage node 506, storage node 508, or the like. In at least one of the various embodiments, file system management server computer 502, storage node 504, storage node 506, or storage node 508, may be comprised of network computers, similar to network computer 300.

In at least one of the various embodiments, each storage node may be interconnected over a network, such as, network 510. In at least one of the various embodiments, network 510 may be comprised similarly as wireless network 108 or network 110.

In at least one of the various embodiments, the storage nodes may be arranged to include one or more storage volumes, such as, storage devices 510, storage devices 512, or storage devices 514. In various embodiments, storage nodes may include more or fewer storage devices than illustrated in FIG. 5.

In one or more of the various embodiments, storage devices may be comprised of one or more physical storage devices, such as, hard disk drives (HDDs), solid state drives (SSDs) or the like.

In one or more of the various embodiments, one or more storage devices may be comprised virtualized storage objects provided by a cloud computing environment.

In at least one of the various embodiments, the functionality of file system management server computer 502 may be incorporated directly into one or more storage nodes, such as, storage node 504, storage node 506, storage node 508, or the like. In such embodiments a file system management application, such as, file system engine 322 or layout engine 324 may be operative on one or more of the storage nodes. Further, in at least one of the various embodiments, some or all functionality of the file system management server computer may be implemented directly on each storage node.

Further, in at least one of the various embodiments, file system management server computer 502 may be arranged to manage one or more distributed tasks of varying types that may be executed on the file system. In at least one of the various embodiments, task types may include, repair tasks, erasure coding (e.g., encoding and decoding) tasks, distributed data writes, cryptographic tasks, compression tasks, decompression tasks, arbitrary compute tasks, or the like.

In one or more of the various embodiments, file system engines may be present on each storage node. Accordingly, in some embodiments, file system engines on the different nodes in file system cluster may be arranged to elect a file system management server computer from among the one or more nodes in the file system cluster. One of ordinary skill in the art will appreciate the custom or conventional election methods may be employed to elect a management node from among the nodes in file system without departing from the scope of the innovations described herein. Further, in some embodiments, file system engines may be arranged to determine a particular election strategy from configuration information to account for local requirements or local circumstance. Also, in some embodiments, conditions that trigger election of a management node may vary depending of file system policy. Accordingly, in some embodiments, file system engines may be arranged to determine if an election may be held based on rules or conditions provided via configuration information to account for local requirements or local circumstances.

Figure 6:
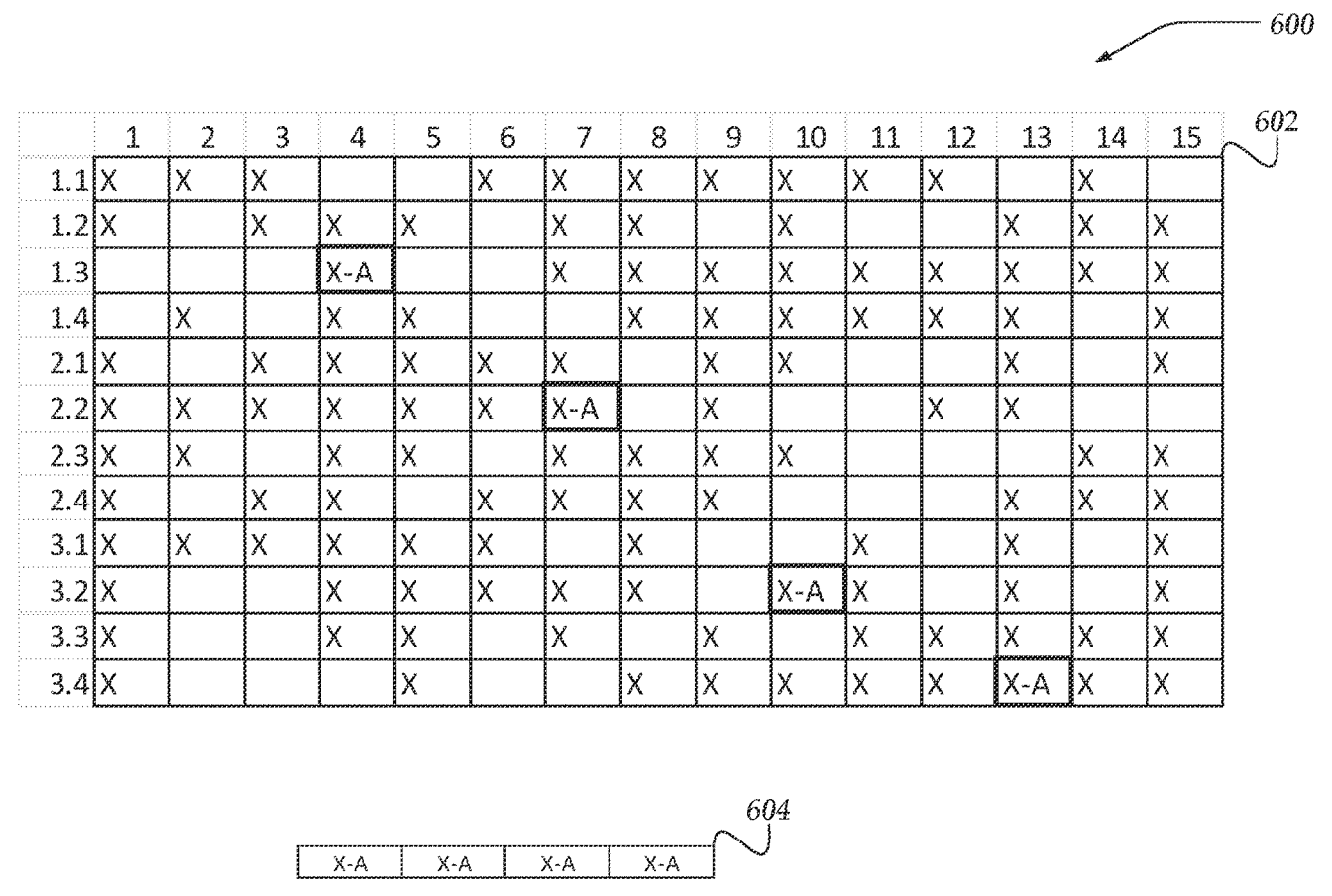

FIG. 6 illustrates a logical schematic of file system 600 for in-place erasure code transcoding for distributed file systems in accordance with one or more of the various embodiments.

In some embodiments, file system 600 may be comprised of a cluster of nodes. In this example, file system 600 includes three nodes each with four storage devices. In FIG. 6, the left 'axis' represent the nodes and storage devices. Accordingly, the first four rows from the top represent the first node and its four storage devices. Likewise, in this example, the next four rows represent the second node and its four storage devices. For brevity and clarity the rows are labeled using. to represent individual nodes and their respective storage devices. Thus, in this example, file system 600 includes three nodes each with four storage devices.

Further, in this example, the top axis (1, . . . , 15) represents boundaries or divisions between different block stores on each storage device. In some embodiments, portions of a storage device that correspond to block store may be referred to as slots. In this example, each storage device has room for 15 block stores. Thus, in this example, each storage device has 15 slots that each can be assigned one block store. Accordingly, a slot represents the portion of a storage device that may be required to store one block store.

In this example, slots in file system 600 that are illustrated to include an "X" may be considered to be slots that are used to store a block store. In some embodiments, some slots may be reserved for unused user capacity, administration space, reserved spare storage space, or the like. In some cases, for some embodiments, spare space in a file system (on one or more storage devices) may be reserved for re-protect or recovery operations to enable the file system to automatically recover from data failures that may be occur in a file system cluster. In this example, empty/unused slots are illustrated absent an X.

In one or more of the various embodiments, block stores may be associated with protection blocks. In some embodiments, protection groups in a file system may be sized to the same value throughout the file system. For example, a 100 GB protection group may be comprised of ten 10 GB block stores. Further, in some embodiments, protection group may store erasure code data used to enable data recovery if block stores in a protection group may be experience data failure. For example, a protection group configured to have a protection level of "1" may be considered protected against the loss of one of its included block stores. Similarly, for example, a a protection group configured to have a protection level of "3" may be considered protected against the loss of three of its included block stores. Note, the particular erasure coding algorithms or methods may vary such that one of ordinary skill in the art will appreciate that different erasure code algorithms may be selected depending on local circumstance or local requirements. Accordingly, in some cases, file system engines may be arranged to determine the particular erasure code methods based on configuration information.

In some embodiments, individual block stores associated with a protection group may be distributed across the file system cluster based on file system policy. For example, a file system policy may declare that a maximum of one block store of a protection group may be stored on the same storage device. Thus, in this example, if a storage device fails, the affected protection groups may recover and re-protected using erasure code information or data stored in their remaining block stores. Also, in some embodiments, a file system may be configured to limit the number of block stores of a given protection group that may be stored on the same file system node.

In some embodiments, allocation rules may be configured for a file system based on local requirements. For example, if an organization is configured to use protection groups that can avoid data loss even if two block stores are lost (e.g., protection level 2), the allocation policy may enforce a limit of two block stores of a single protection group on each file system. Thus, in this example, if an entire file system is lost, at most only two block stores from each protection group in the file system may be lost, enabling them all to be restored from the remaining block stores located on remaining nodes. In contrast, in some embodiments, if a protection group configured for protection level 2 had three block stores on the same node or storage device, the failure of that node or storage device would result in data loss since the number lost block stores would exceed the protection level of the protection group.

Accordingly, in some embodiments, file system engines may be arranged to distribute block stores associated with the same protection group across the file system cluster. In this example, protection group 604 represents a protection group with four associated block stores. In this example, the block stores that comprise protection group 604 may be observed in layout 602, indicating how they may be distributed across the file system. In this example, the block stores for protection group 604 are stored the 4th slot of storage device 3 of node 1; the 7th slot of storage device 2 on node 2; the 10th slot on storage device 2 of node 3; and the 13th slot of storage device 4 on node 3.

Further, in some embodiments, file system may be configured such that each protection group and block store has the same capacity. Further, in some embodiments, each protection group in the file system may have the same protection level. However, in some cases, for some embodiments, one or more protection groups may be configured to have different protection levels. For example, if a file system may be arranged to direct some data or data types to particular protection groups, those particular protection groups may be configured to have different protection levels. However, this may result in more complex management overhead so it may be advantageous to restrict protection groups in a file system to having the same capacity.

In some cases, for various reasons, an organization may desire to change the erasure code for a file system. For example, in some embodiments, an organization may desire increased protection level (or decreased protection level). Likewise, in some cases, for some embodiments, organizations may want to add more capacity to an existing file system. However, naively adding more capacity may result in less efficient storage. Thus, in some cases, organizations may be motivated to modify erasure coding for a file system for various reasons.

Conventionally, erasure coding methods may be classified based on the amount of protected blocks and the number required to restore lost blocks. For example, if a 10 block storage system allocates 9 blocks (9/10) of its capacity to data and one tenth (1/10) of its capacity for erasure code information, it may be referred to as using a 10/9 erasure code. Thus, a 10/9 erasure code system will have an efficiency of 90% because of the 10 blocks in the system, 9 are available for data storage. Likewise, a system with an erasure code of 10/8 would be considered less efficient because it has * blocks for data and 2 blocks for erasure code information resulting in an efficiency of 80%. Thus, naively increasing protection levels may decrease storage efficiency.

Similarly, naively increasing capacity may result in large amounts of potential capacity being unnecessarily allocation to erasure coding. For example, a 10 TB storage system that is 90% efficient would reserve 1 TB for erasure coding. If the 10 TB storage system is doubled to 20 TB, 2 TB would be reserved for erasure coding without providing increased protection levels.

In some embodiments, adding capacity implies adding more protection groups and distributing their associated block stores across the file system. Naive capacity increases would add more protection groups, each using that same sized block stores as the existing protection groups. However, in this case, the erasure code and erasure code efficiency would remain unchanged which may result in an undesirable amount of capacity being reserved for erasure coding.

Further, in some embodiments, adding capacity may coincide with an organization's intention to increase the protection level of its protection groups without reducing the storage efficiency of the protection groups. Conventionally, if more block stores (or portions of block stores) are allocated for storing erasure code information the overall storage efficiency of a protection group and the file system as a whole will be reduced. For example, converting a protection group from a 10/8 erasure code that protects against one data failure to a 10/8 erasure code that protects against two data failures would consume 20% versus 10%. Also, it would reduce the effective capacity of each protection group because more block stores would be dedicated to erasure code information.

Alternatively, in some embodiments, file system engines may be arranged to enable erasure code of protection groups to modified by reducing the size of the block stores associated with each protection group. For example, if a protection group has 10 block stores with 9 reserved for data and 1 reserved for erasure code information, re-configuring the protection group to use smaller block stores may enable the storage efficiency to be preserved or improved while maintaining the same or greater protection level. For example, the protection group with 10 block stores may be reconfigured to have 20 half-sized block stores. Thus, same as before, a protection level of 1, would require one block store reserved for erasure code information while 19 may be used for data. Similarly, in some embodiments, doubling the block stores while halving their size, would enable configuring the protection group to have protection level of two without reducing storage efficient. For example, in some embodiments, a ten-block stores wide protection group using an 10/9 erasure code that may be converted to use an 20/18 erasure code would have protection level of two without decreasing storage efficiency.

Note, in some embodiments, various file systems may employ a variety of layout policies, protection policies, or the like. Accordingly, in some embodiments, different file systems may employ different erasure coding, protection groups sizing, block store sizing, block store distribution policies, or the like, without departing from the scope of the innovations described herein. Accordingly, for brevity and clarity, details of particular erasure code algorithms, layout polices, and so on, are omitted from this description.

Figure 7A:
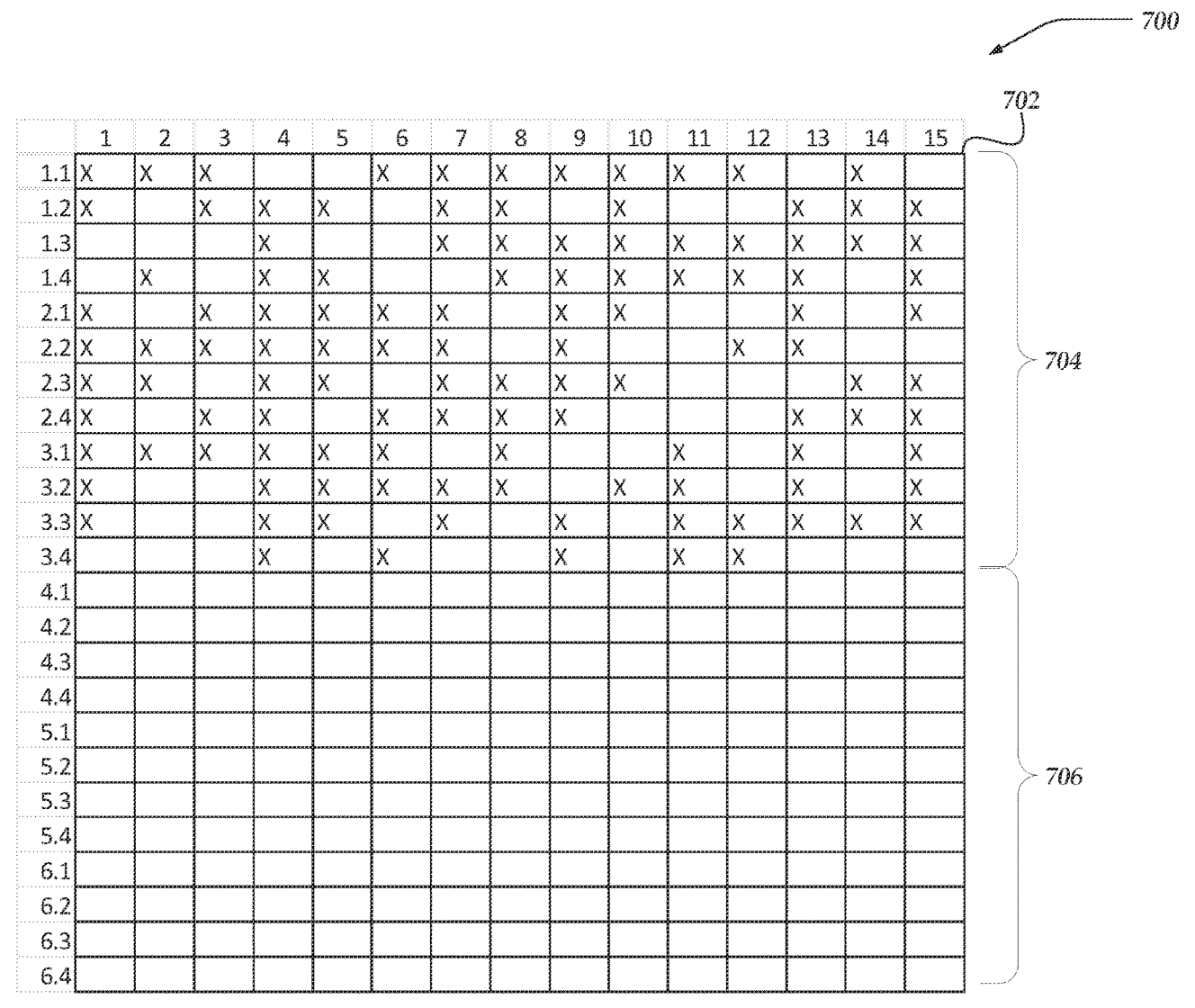

FIG. 7A illustrates a logical schematic of file system 700 for in-place erasure code transcoding for distributed file systems in accordance with one or more of the various embodiments.

Organizations may have a variety of reasons for modifying erasure codes. For example, in some embodiments, it may be advantageous to modify erasure codes if additional storage capacity may be added to file system because naively expanding capacity absent modifying erasure codes may result in an undesirable or otherwise disadvantageous amount of the storage capacity being dedicated to erasure code information.

Further, in many cases, it may be undesirable or disadvantageous for organizations to convert a file system from one erasure code to another in an offline mode that disables the file system while the file system is transcoded from one erasure code to another. Accordingly, in some embodiments, innovations described herein enable organizations to change erasure codes while the file system remains operational.

In some embodiments, transcoding a file system from one erasure code to another may require sufficient working space that is otherwise unused by the file system to enable in-place or online erasure code transcoding to take place. In some cases, erasure code modification may be desired if capacity is being added to an existing file system. Accordingly, in such scenarios, it may be expected that the original file system is reaching its effective capacity. Thus, in some embodiments, it may be likely that the current file system does not have enough unused capacity to support online or in-place erasure code transcoding.

Accordingly, in some embodiments, file system engines may be arranged to performing erasure code transcoding if the capacity of the file system is being increased. Thus, in some embodiments, the storage being added to the file system may provide the necessary workspace to enable erasure code transcoding.

In this example, for some embodiments, the original nodes and storage devices for file system 700 may be represented by layout 702. In this example, similar to layout 602 for file system 600, layout 702 shows slots and block stores used in file system 700. In this example, the current or original file system may be represented by layout portion 704. In one or more of the various embodiments, layout portion 706 may be considered to represent additional capacity that may be added to file system 700.

In one or more of the various embodiments, initially the slots in the newly added capacity (new nodes and new storage devices) may be unused such that the file system engines may be enabled to use the unused capacity to perform the actions for converting file system 700 to use a different erasure code.

Note, for brevity and clarity, in this example, a doubling of capacity is shown. However, the innovations described herein are not so limited. Accordingly, in some embodiments, more or less capacity may be added as long as the additional capacity may be sufficient to provide the working space for transcoding the file system to the new erasure code. In some embodiments, file system engines may be arranged to compute a minimum capacity increase based on the amount of unused capacity that may be required to perform the transcoding.

Also, for brevity and clarity, in this example, the new nodes and storage devices associated with layout portion 706 are illustrated as having the same number of storage devices and same amount of slots per storage device. In practice, in some embodiments, a file system may include nodes with different amount of storage devices or storage devices with different numbers of slots.

Figure 7B:
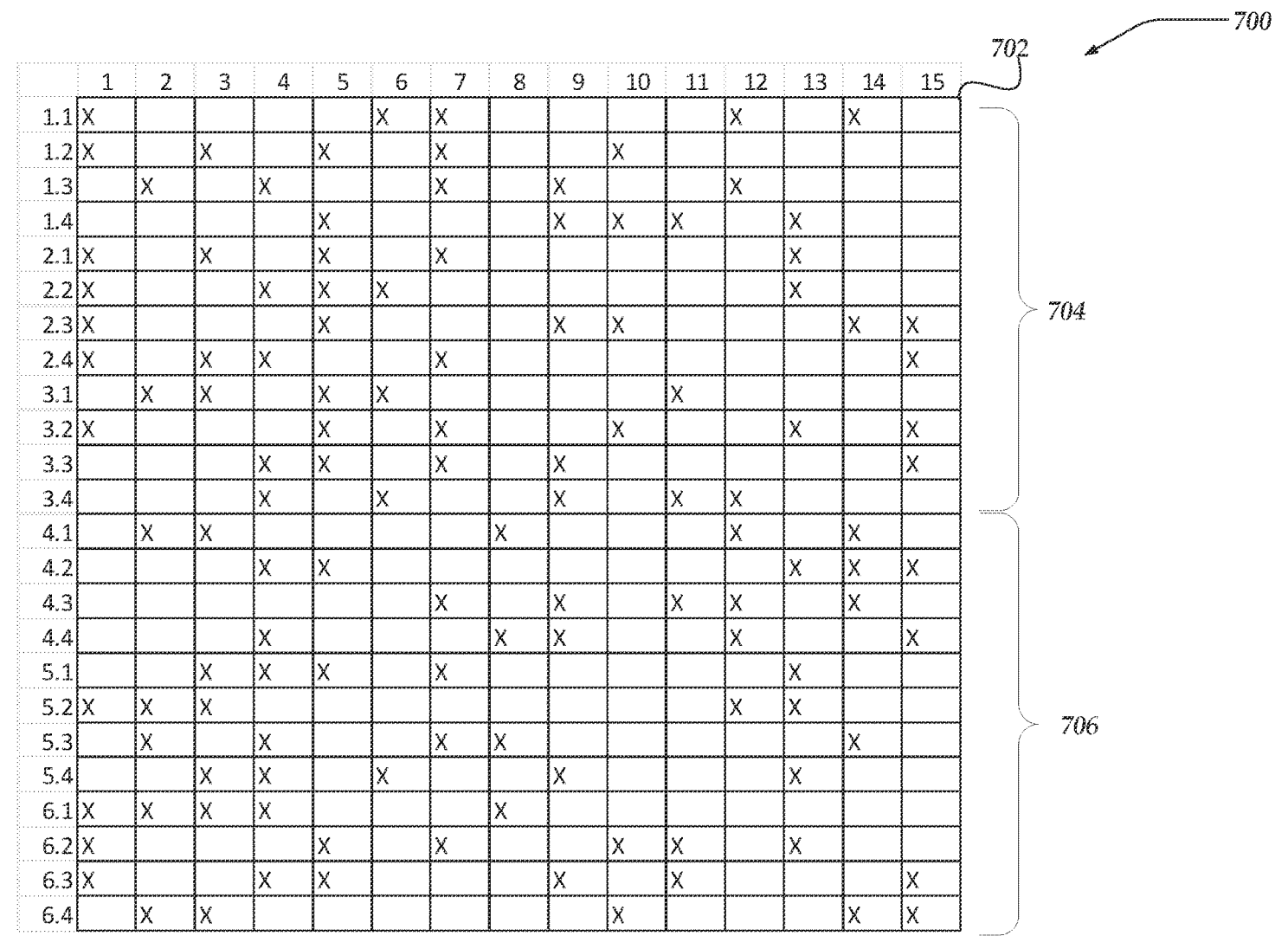

FIG. 7B illustrates a logical schematic of file system 700 for in-place erasure code transcoding for distributed file systems in accordance with one or more of the various embodiments.

In some embodiments, if additional capacity may be added to a file system layout (e.g., layout portion 706), file system engines may be arranged to balance the distribution of block stores in the file system to use the additional capacity. Accordingly, in some embodiments, file system engines may be arranged to create additional unused capacity (empty slots) on the nodes or storage devices of the original layout portion (e.g., layout portion 704). Thus, in this example, for some embodiments, half of the block stores from layout portion 704 may be copied to layout portion 706. Note, in some embodiments, file system engines may be arranged to copy these block stores using conventional or existing file system operations. Accordingly, in some embodiments, while the copying may consume bandwidth, compute cycles, or the like, the file system may otherwise remain operational. For example, in some embodiments, file system engines may copy block stores from layout portion 704 to layout portion 706 using existing file system features, such as, concurrency, locking, data transfer, indexing, or the like, that may be provided via 'normal' file system services that are mixed-in with servicing client activity or client requests.

Figure 7C:
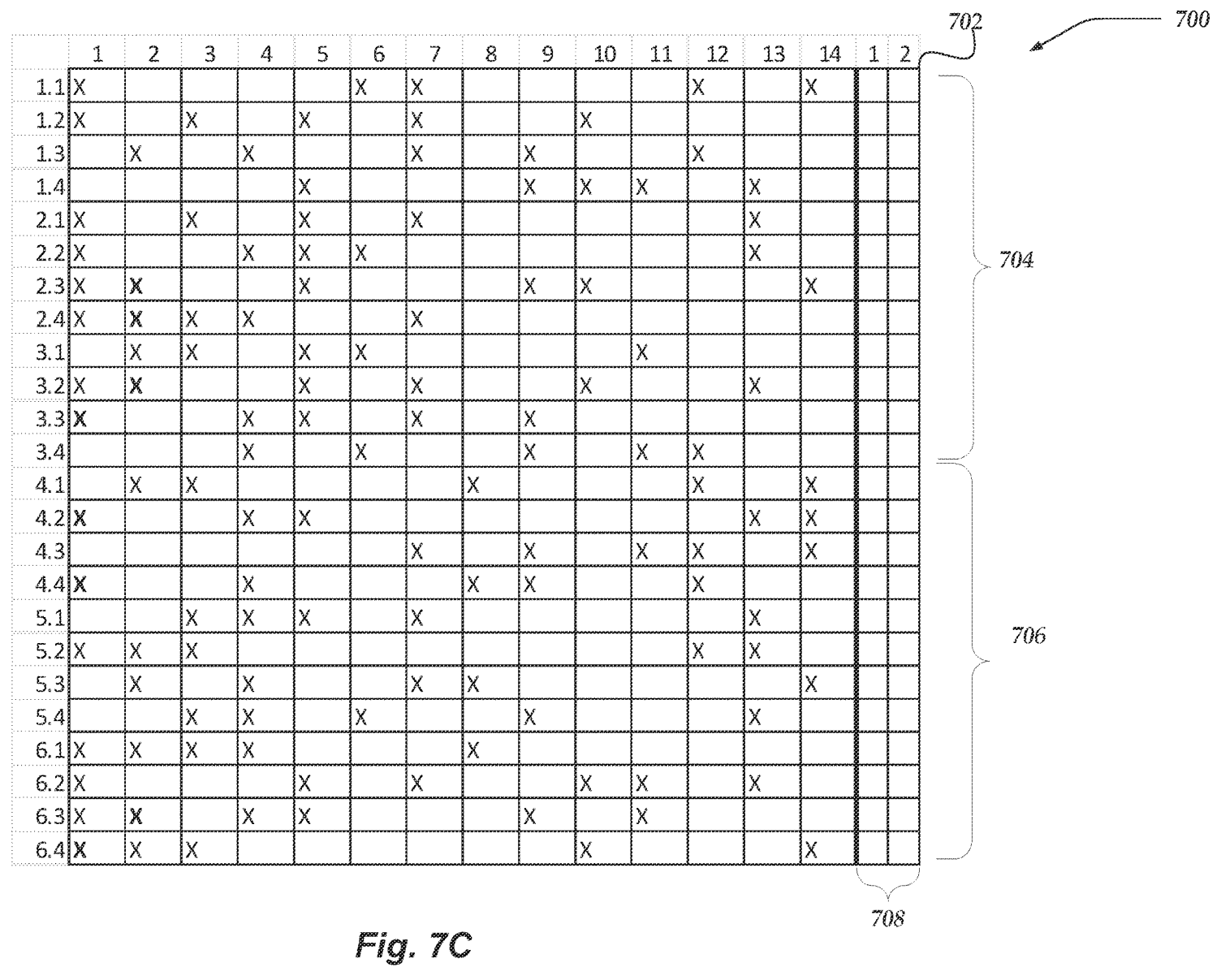

FIG. 7C illustrates a logical schematic of file system 700 for in-place erasure code transcoding for distributed file systems in accordance with one or more of the various embodiments.

In one or more of the various embodiments, if the block stores from the original file system have been balanced or redistributed, as described above, file system engines may be arranged to clear space on each nodes and each storage devices to make room for block stores that may be transcoded to the new erasure code. Accordingly, in some embodiments, file system engines may be arranged to copy block stores from the last slots of the storage devices to empty slots that may be nearest to the beginning of the storage devices.

Accordingly, for example, the block store in the second slot of the third storage device of the second node (2.3, 2) of layout 702 represents a block store that was copied from the last slot of the third storage device of the second node. In some embodiments, file system engines may be arranged to copy block stores stored in the last slots into empty slots that are closer to the beginning of the slots until a desired number of slots may be cleared of block stores.

Further, in some embodiments, modifying the erasure code may require additional block stores. Accordingly, in some embodiments, file system engines may be arranged to divide the original slots into smaller block stores to support different erasure codes. Increasing the number of block stores per protection group enables the capacity of protection group to remain unchanged while enabling more efficient or resilient erasure codes. In this example, slots 708 illustrate how the original slot size may be reduced to enable more slots to be opened. Note, in some embodiments, these slots may have less capacity such that they block stores they support may have less capacity as well. But the protection groups that may eventually rely on these smaller slots may have the same capacity because they will map more block stores that are smaller than the original block stores.

Accordingly, in some embodiments, file system engines may be arranged to deprovision the original slots that, in this example, were included in rows 708. Thus, in some embodiments, the block stores previously stored in those slots may be moved to other slots. Then, if required, the file system engine may be arranged to reprovision slots in those portions of the file system/storage devices to match the size needed for new erasure code. For example, if a new erasure code requires twice as many block stores per protection group as the current/previous erasure code, the newly provisioned slots may be half the size of the prior slots.

Figure 7D:
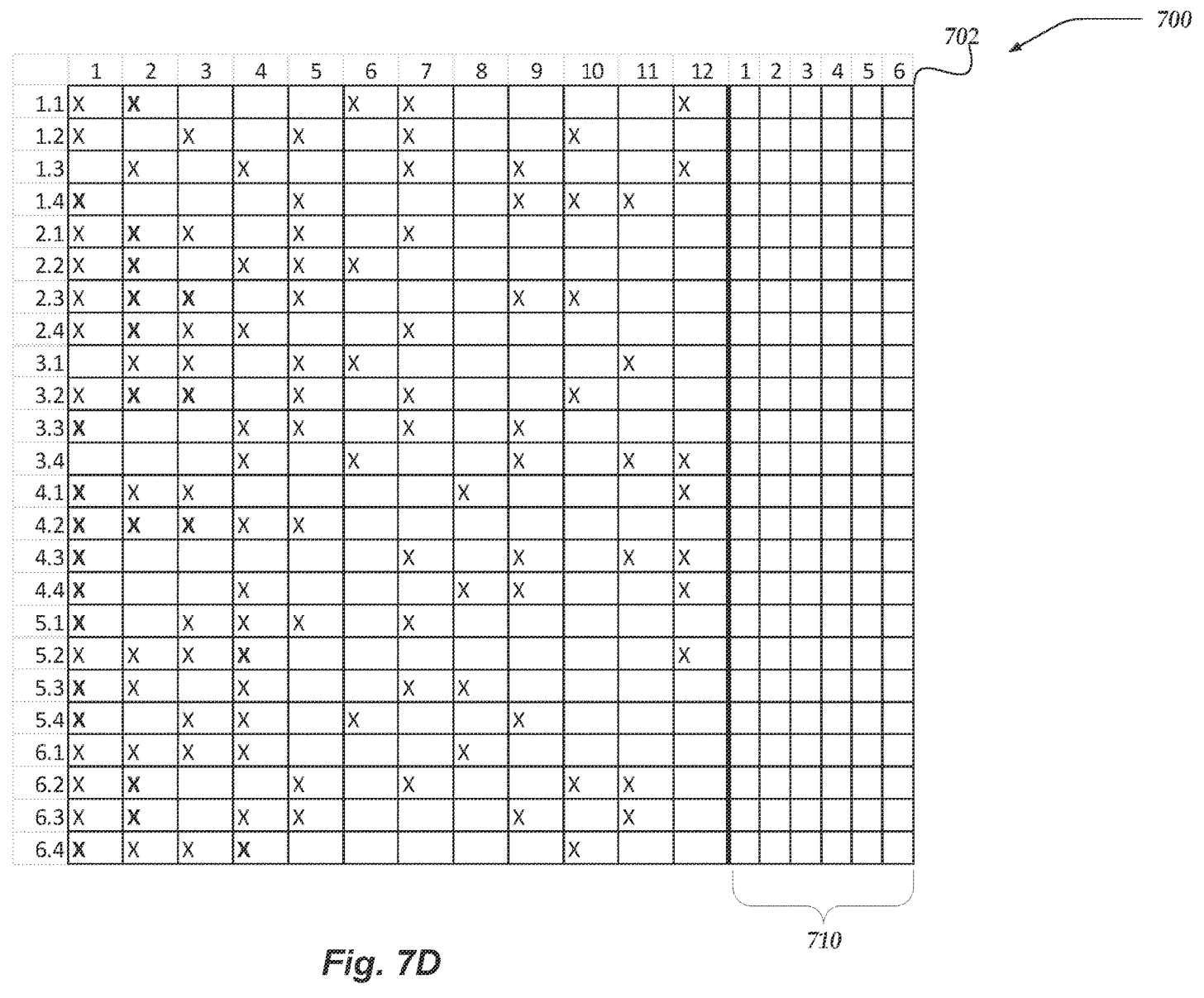

FIG. 7D illustrates a logical schematic of file system 700 for in-place erasure code transcoding for distributed file systems in accordance with one or more of the various embodiments.

In this example, for some embodiments, the file system engine has continued to move block stores from slots at the end of the storage devices to other empty slots. Here, in this example, three bands of original sized block stores have been moved to original sized slots. In this example, for some embodiments, the file system engine has reprovisioned the empty space (e.g., slots 710) into slots that may be half the size of the original slots. Note, one of ordinary experience in the art will appreciate the "new" slots may be reprovisioned to a size based on the particular erasure code, data protection algorithms, or the like, rather than being limited to any particular fraction of the previous slot-size.

In some embodiments, file system engines may be arranged to continue moving original sized block stores and reorganizing the 'new' slots at least until there may be enough room in the new slots to store one or more protection groups. Accordingly, in some embodiments, file system engines may be arranged to monitor the capacity of the new slots to determine if one or more protection groups may be moved into the new slots. In some embodiments, if unused space is limited in the original size slots, file system engines may be arranged to begin moving protection groups as soon as possible. Otherwise, in some embodiments, file system engines may be arranged to move protection groups based on other rules or policies. For example, in some embodiments, file system engines may be configured to continue moving original sized block stores until there may be enough room for a defined number of protection groups before beginning to move block stores from the original sized slots to the resized slots. Thus, in some embodiments, the file system will maintain at least the same fault tolerance/ protection levels during the transition to the new erasure code.

In one or more of the various embodiments, the portion of the file system that is reconfigured to have new-sized block stores may be considered to be a separate logical partition. Thus, in some embodiments, file system engines may allocate new or pending write operations to the new slice partition. Generally, in some embodiments, file system engines may be arranged to randomly balance incoming data writes to particular nodes, storage devices, protection groups, or the like, as per its normal operation policies. Accordingly, in some embodiments, data from some new writes may be assigned to protection groups that are stored in the partition with the new-sized slots (e.g., partition 710). Thus, in one or more of the various embodiments, file system engines may be arranged to encode such data using the new erasure code before storing it in the new partitions.

Figure 8:
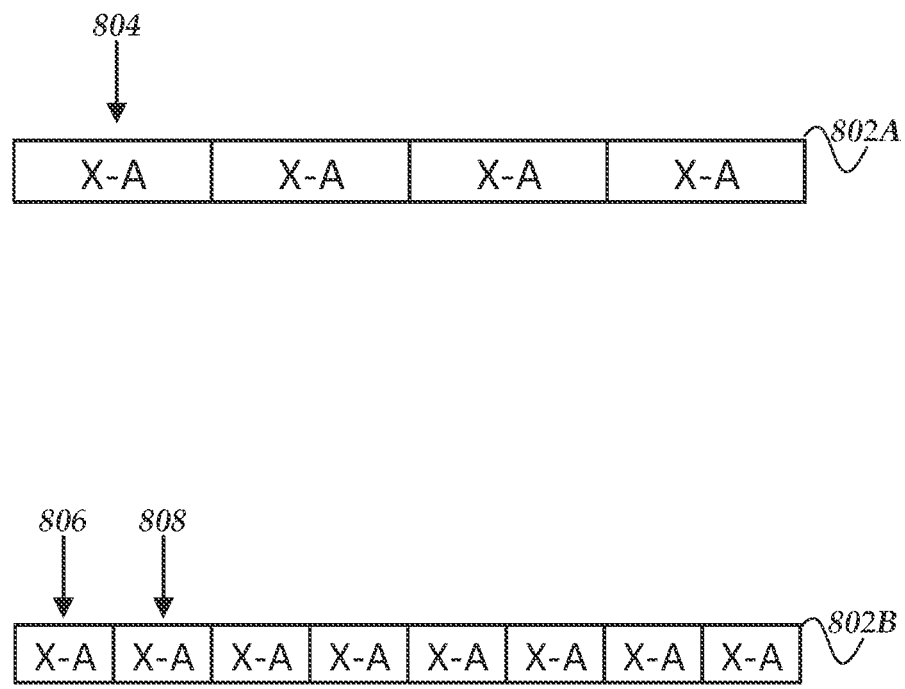
FIG. 8 illustrates a logical schematic of protections groups for in-place erasure code transcoding for distributed file systems in accordance with one or more of the various embodiment.

FIG. 8 illustrates a logical schematic of protections groups for in-place erasure code transcoding for distributed file systems in accordance with one or more of the various embodiments. As described above, for some embodiments, protection groups may be composed of one or more block stores. In some embodiments, file system engines may be arranged to distribute individual block stores that comprise protection groups in slots that are spread throughout the file system. Thus, in this example, even though protection group 802A is represented as storing block stores contiguously, in practice file system engines may be arranged to spread these block stores around the file system to conform to data safety policies, or the like. See, FIG. 6 and its description.

Also, in this example, protection group 802A may be considered to represent a protection group before the data is transcoded to a new erasure code and protection group 802B may represent the same protection group after it has been transcoded to a new erasure code. This example illustrates how the capacity of protection groups remains the same but with an increased number of block stores after transcoding to a new erasure code. For example, in some embodiments, block store 804 may be transcoded into block store 806 and block store 808. Note, in this example, the number of block stores is doubled. However, in practice, the number of block stores in the new version of the protection groups may vary depending on the particular erasure code being used or other file system policy considerations. Also, in some embodiments, as block stores may be composed of smaller file system objects (e.g., blocks), the contents of one particular block store may be distributed to any number of block stores in the protection group. Accordingly, the apparent direct mapping of block store 804 directly to block store 806 and block store 808 shown in FIG. 8 should be considered a simplified non-limiting example.

Generalized Operations

Figure 9:
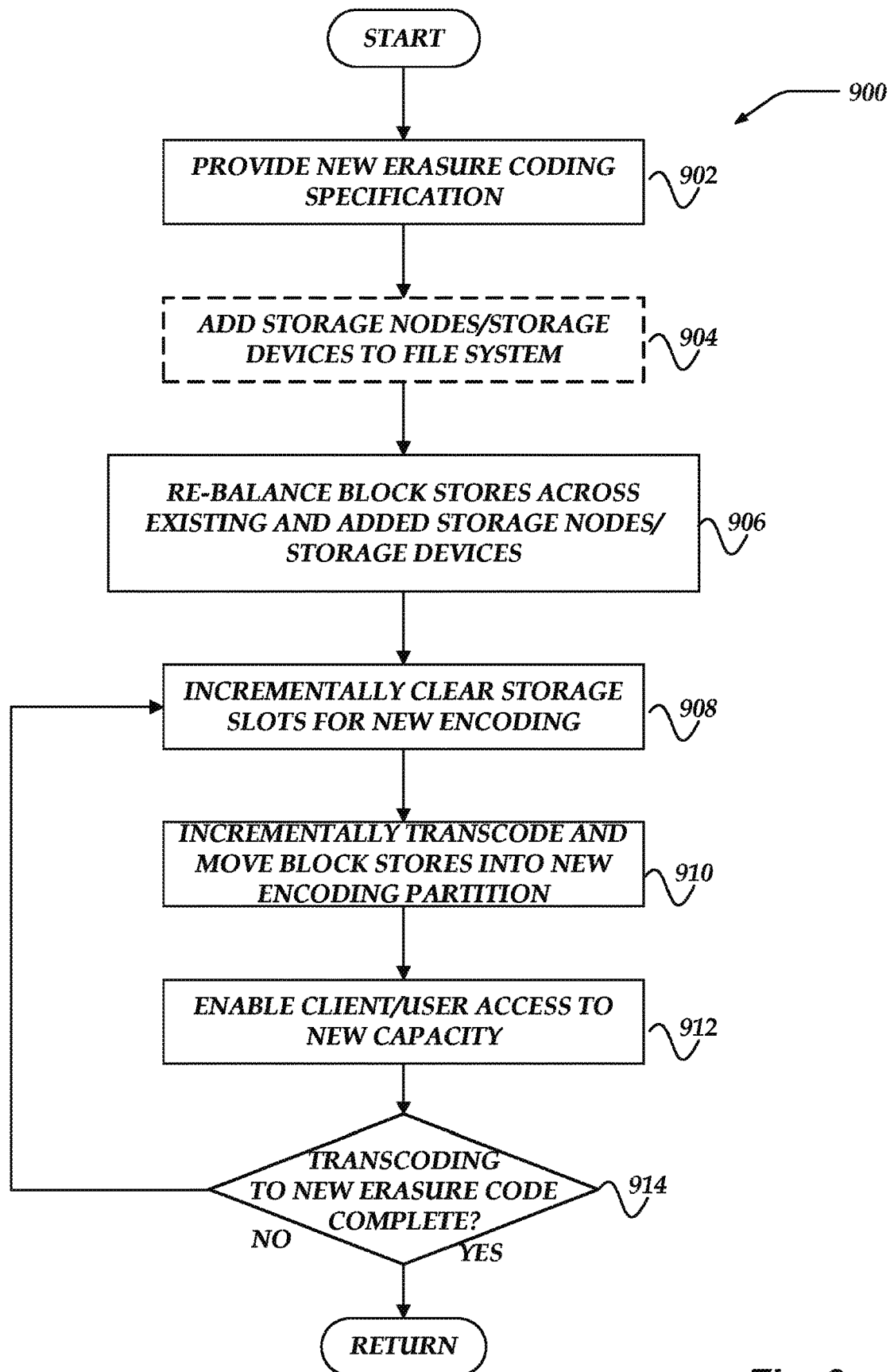
FIG. 9 illustrates an overview flowchart for a process for in-place erasure code transcoding for distributed file systems in accordance with one or more of the various embodiments.
Figure 10:
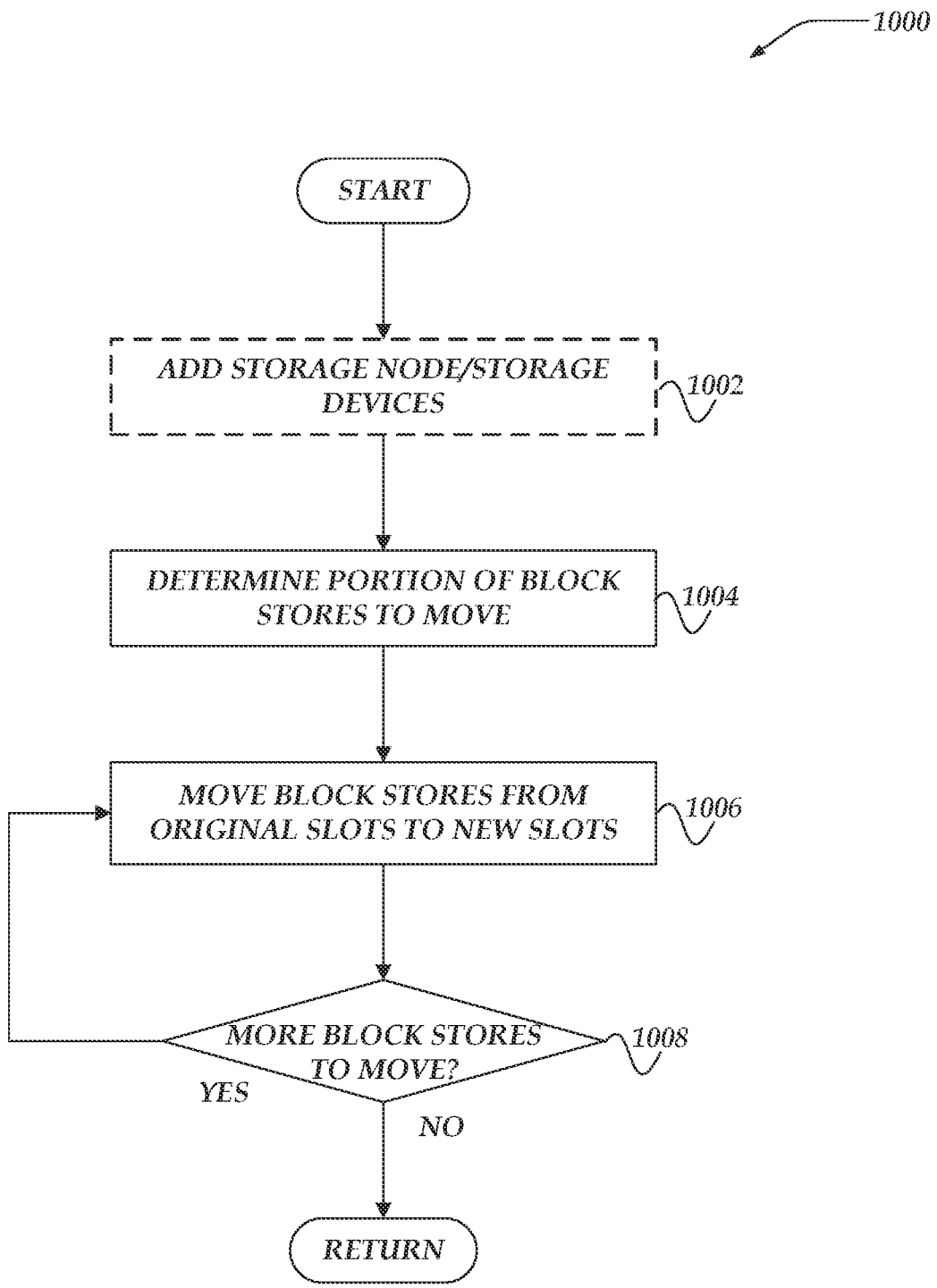
FIG. 10 illustrates a flowchart for a process for in-place erasure code transcoding for distributed file systems in accordance with one or more of the various embodiments.
Figure 11:
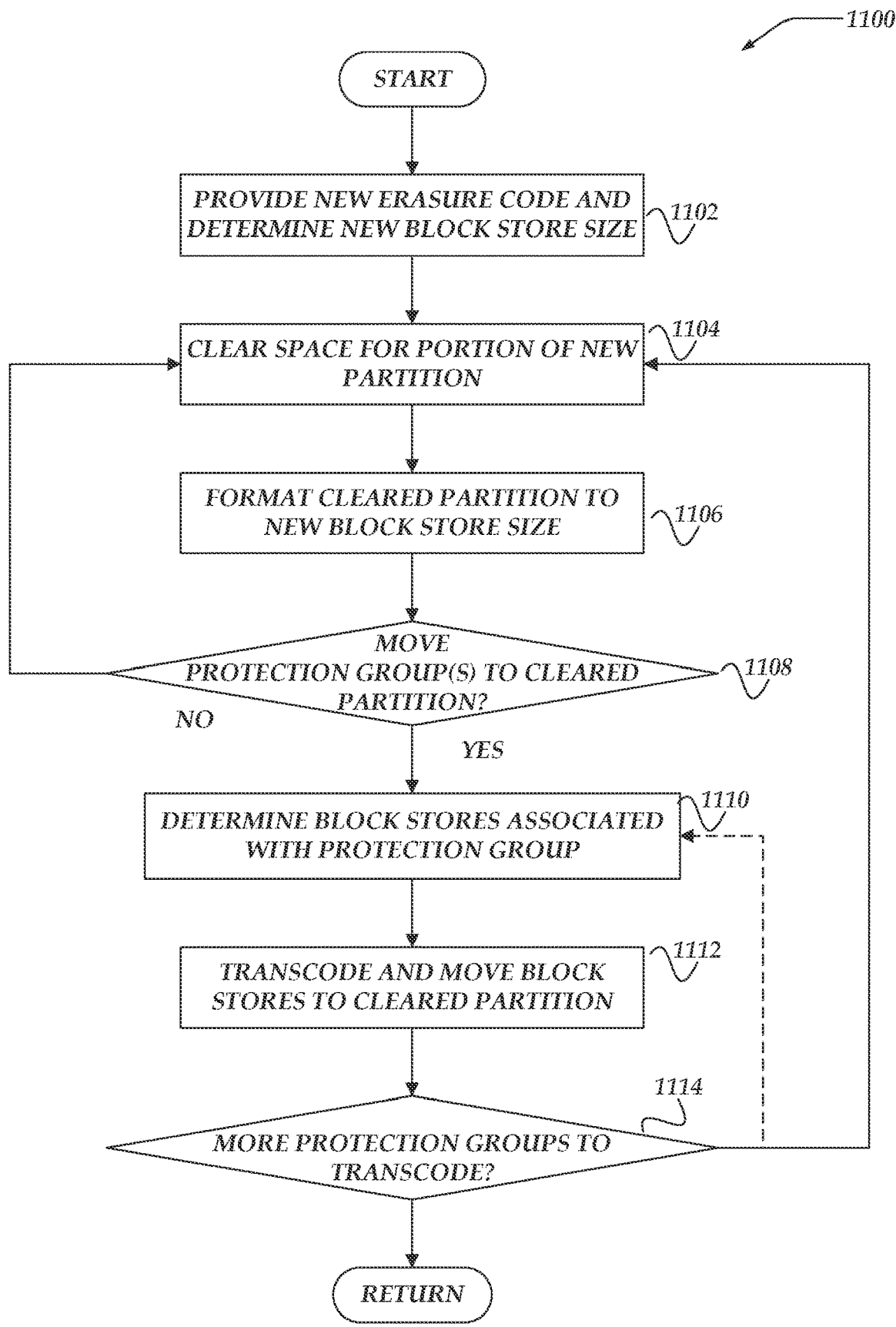
FIG. 11 illustrates a flowchart for a process for in-place erasure code transcoding for distributed file systems in accordance with one or more of the various embodiments.

FIGS. 9-11 represent generalized operations for in-place erasure code transcoding for distributed file systems in accordance with one or more of the various embodiments. In one or more of the various embodiments, processes 900, 1000, and 1100 described in conjunction with FIGS. 9-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may perform actions for in-place erasure code transcoding for distributed file systems in accordance with at least one of the various embodiments or architectures such as those described in conjunction with FIGS. 4-8. Further, in one or more of the various embodiments, some or all of the actions performed by processes 900, 1000, and 1100 may be executed in part by file system engine 322.

FIG. 9 illustrates an overview flowchart for process 900 for in-place erasure code transcoding for distributed file systems in accordance with one or more of the various embodiments. After a start flowchart block, at flowchart block 902, in one or more of the various embodiments, a new or updated erasure code specification may be provided to a file system engine. As described above, erasure code specifications may declare or define various features associated with protecting against data loss in case of storage failures. For example, erasure code specification may declare protection levels, specific erasure code algorithms, or the like. Note, one of ordinary skill in the art will appreciate that the innovations disclosed herein are generally independent from the specific erasure code algorithms that may be used. Accordingly, in some embodiments, file system engines may be arranged to determine the particular erasure code or erasure code specification for a file system based on configuration information to account for local requirements or local circumstances.

At flowchart block 904, in one or more of the various embodiments, optionally, additional storage nodes or storage devices may be provided to a file system. As described herein, it may be advantageous for organizations to modify erasure code specifications if they are adding storage to a file system. Namely, because, for example, adding storage capacity without updating the erasure code may result in less than optimal storage efficiency. Other reasons may include changes in data loss risk policies, changes in device capacity, device performance characteristics, or the like. Note, adding additional storage at this point may not increase the amount of storage available to users because, in some embodiments, the amount of user accessible storage may be tied to the number of protection groups in the file system. Thus, in some embodiments, at this stage, the number of available protection groups may not have increased even though there may be more additional storage space because of the addition of storage nodes or storage devices.

In some embodiments, the file system may have sufficient unused or unallocated space to enable in-place erasure code transcoding to the new erasure code specification. Thus, in some cases, additional storage may not be required for in-place erasure code transcoding.

Note, this flowchart block is indicated as being optional because in some cases the file system may include sufficient unused space to enable in-place erasure code transcoding for distributed file systems rather than requiring additional storage nodes or storage devices to provide the necessary working space for erasure code transcoding.

At flowchart block 906, in one or more of the various embodiments, file system engines may be arranged to distribute block stores in the file system into the new storage space. In some embodiments, file system engines may be arranged to move a proportion of the block stores from the original storage space to the added storage space. Accordingly, in some embodiments, additional room may be provided to facility efficient conversion to the new erasure code specification.

At flowchart block 908, in one or more of the various embodiments, file system engines may be arranged to incrementally clear storage slots from a partition that used the new erasure code. As described above, in some embodiments, file system engines may incrementally move block stores from slots at the 'end' of storage devices to slots nearest the beginning of the storage devices. Accordingly, in some embodiments, a portion of the file system may be cleared of block stores. In some cases, for brevity or clarity, the cleared space may be referred to as a new partition since the file system engines may logically track the boundary between the slots that are cleared and the other non-cleared slots in the file system.

At flowchart block 910, in one or more of the various embodiments, file system engines may be arranged to incrementally transcode and move block stores into the cleared partition. In one or more of the various embodiments, file system engines may reformat the new partition to support block sizes based on the new erasure code specification and move block stores from the original partition to the new partition. Accordingly, in some embodiments, file system engines may be arranged to transcode the block stores being moved into the new erasure code. In some embodiments, file system engines may be arranged to move all the block stores for the same protection group at the same time so the new erasure code specification may be applied to the protection group as a whole.

At flowchart block 912, in one or more of the various embodiments, file system engines may be arranged to enable file system clients/users to access the new file system capacity. In some embodiments, file system engines may generate or enable additional protection groups in the remaining storage space. Accordingly, in some embodiments, if the protection groups using the old erasure code specification have been converted to the new erasure code specification, the file system engines may release additional protection groups to the file system for use by clients/users. Going forward these released protection groups may use the new erasure code specification.

In one or more of the various embodiments, file system engines may be arranged to incrementally release transcoded storage capacity to the users of the file system as it is provisioned or transcoded.

At flowchart decision block 914, in one or more of the various embodiments, if the transcoding to the new erasure code may be complete, control may be returned to a calling process; otherwise, control may loop back to block 908.

FIG. 10 illustrates a flowchart for process 1000 for in-place erasure code transcoding for distributed file systems in accordance with one or more of the various embodiments. After a start flowchart block, at flowchart block 1002, in one or more of the various embodiments, optionally, new or additional storage nodes or storage devices may be added to the file system.

In some cases, organizations may be motivated to modify erasure code specification for various reasons, such as, changes to data loss risk policies, data, desired storage efficiency, or the like. For example, as described above, naively adding storage capacity to a file system may lead to a loss in storage efficiency for some erasure codes or non-optimal erasure code for the resulting file system. Thus, in some cases, it may be advantageous for organizations to change erasure codes if they may be expanding the capacity of a file system.

In some cases, the current file system may be close to its capacity before an organization decides to change erasure codes. Accordingly, in some embodiments, the file system may not have enough unused space to provide working space that may be required for converting to a new erasure code without disruption to the operation of the file system. For example, in many cases, it may be disadvantageous to shutdown the file system and use other off-line/auxiliary storage to perform the conversion. Thus, it may be advantageous to convert a file system to a different erasure code when the additional capacity is being added to the system. In some embodiments, this may enable the file system engine to use the additional storage space to facilitate the conversion to the new erasure code before increasing the releasing the additional capacity for use by users/clients.

Accordingly, in some embodiments, file system engines may be arranged to recognize the added storage nodes or storage devices for use in the conversion to the new erasure code specification while not immediately releasing the storage space to the file system as a whole. Accordingly, in some embodiments, the added storage nodes or storage devices may be unavailable for general user level capacity until the conversion to the new erasure code specification may be completed.

In some cases, there may be enough unused capacity in the current set of storage nodes or storage devices to enable file system engines to convert the file system to the new erasure code specification. For example, if a new file system is deployed with a first erasure code specification, the organization may soon determined they need increased protection from data loss. In this case, for some embodiments, the file system may be converted to the new erasure code specification without attaching additional storage nodes or storage devices.

Note, this flowchart block is indicated as being optional because in some cases the file system may include sufficient unused space to enable in-place erasure code transcoding for distributed file systems rather than requiring additional storage nodes or storage devices to provide the necessary working space for erasure code transcoding.

In one or more of the various embodiments, user capacity may be determined by the number protection groups that are available for storing user data. Accordingly, in some embodiments, simply adding new storage nodes or storage devices without formatting/configuring more protection groups for the users may provide an increased working space without effectively increasing the amount of storage that may be available to file system clients.

At flowchart block 1004, in one or more of the various embodiments, file system engines may be arranged to determine one or more block stores to move. In one or more of the various embodiments, file system engines may be configured to employ various selection strategies for determining which block stores should be moved from the original storage nodes or storage devices to new storage nodes or storage devices. For example, in some cases, file system engines may be arranged to randomly select block stores to move from the original storage devices to the newly added storage space. In other cases, other considerations may be taken, such as treating recently accessed or actively accessed block stores differently from less active block stores. For example, in some embodiments, file system engines may be configured to move block stores based on one or more activity metrics. Accordingly, in some embodiments, file system engines may be arranged to employ rules, instructions, or the like, provided via configuration information to determine which how to select block stores for moving to the added storage to account for local requirements or local circumstances.

Further, in some embodiments, other transient circumstances, such as, active locks, caching considerations, or the like, may influence if or when block stores are moved from the original storage to the new storage.

At flowchart block 1006, in one or more of the various embodiments, file system engines may be arranged to move the one or more block stores from the original slots to new slots. In one or more of the various embodiments, file system engines may be arranged to move the selected block stores to the added storage. In some embodiments, file system engines may be arranged to employ otherwise built-in functionality for moving data within the file system. Accordingly, in some embodiments, actions or operations related to caching, lock contention, or the like, may be performed as part of the general feature set of the file system. Likewise, in some embodiments, since many block stores are located on different storage nodes or storage devices, the moving of block stores to the added storage may be a highly parallelizable operation. In some embodiments, file system engines may be arranged to determine the amount of file system resources, such as, bandwidth, compute resources, or the like, based on configuration information. Thus, in some cases, moving the block stores may be prioritized or de-prioritized based on one or more file system policies.

At flowchart decision block 1008, in one or more of the various embodiments, if there may be more block stores to move, control may loop back to flowchart block 1006; otherwise, control may be returned to a calling process.

In one or more of the various embodiments, file system engines may be configured to move a portion of block stores sufficient to ensure that there may be enough working space in the original storage spaces to enable the transcoding to enable conversion to the new erasure code specification. In some cases, for some embodiments, file system engines may be configured to move a proportion of block stores based on the proportion of new storage space that is added. In other cases, for some embodiments, file system engines may be arranged to re-balance the block stores in the file system evenly across the old storage and the new storage.

Note, in some embodiments, as mentioned, moving the block stores or evenly re-balancing them may not increase the amount of storage available to users because new protection groups are not being made available. Here, the file system engines may be moving block stores while leaving their association with their protection groups in place.

In some embodiments, file system engines may be arranged to update internal indexes to maintain the relationships between the block stores and their protection groups. Note, one of ordinary skill in the art will appreciate that the particular data structures, file system tables, or the like, used for associating block stores with protection groups may vary depending on the underlying architecture of the file system without departing from the scope of the innovations disclosed herein.

FIG. 11 illustrates a flowchart for process 1100 for in-place erasure code transcoding for distributed file systems in accordance with one or more of the various embodiments. After a start flowchart block, at flowchart block 1102, in one or more of the various embodiments, file system engines may be provided a new erasure code specification and determined a new block store size. As described above, erasure code specifications may specify various characteristics or criteria for a data protection policy. Accordingly, in some embodiments, file system engines may be arranged to determine a new block store size that may enable the file system to conform to the new erasure code specification while keeping the storage size/capacity of protection groups unchanged.

At flowchart block 1104, in one or more of the various embodiments, file system engines may be arranged to file system engines may be arranged to clear space for a new partition. In one or more of the various embodiments, file system engines may be arranged to designate a portion of the existing file system to be a new partition. The new partition may be designated to store data using the new erasure code specification. Also, in some cases, portions of the new partition may be temporarily used as a working space to perform erasure code transcoding if needed.

In some embodiments, file system engines may be arranged to reserve one or more slots on one or more of the storage devices that comprise the file system as the new partition. In the examples, shown above, file system engines may reserve an equal number of slots from storage devices for the new partition. However, in some embodiments, in practice one or more storage devices may have a different number of slots. Thus, in some embodiments, in some cases, the number of slots reserved for the new partition may be different across storage nodes or storage devices. However, in some embodiments, generally, file system engines may be arranged to assign slots at the nearest the end of storage devices to the new partition.

At flowchart block 1106, in one or more of the various embodiments, file system engines may be arranged to format/prepare the cleared partition to employ the new block store size. In some embodiments, file systems may be arranged to employ various data structures, configuration values, constraints, parameters, or the like, that may declare or enforce block store sizes. Accordingly, in some embodiments, formatting the cleared partition may include modifying one or more data structures, configuration values, constraints, parameters, or the like, to set the block store size for the new partition to conform the new partition to the new erasure code specification. Note, the particular action may depend on the underlying structure of the particular file system. For example, in some embodiments, formatting a partition to a new block store size may include setting a single value (a new block store size) in a configuration set. However, one of ordinary skill in the art will appreciate the implementation details associated with setting the block store size of a particular file system or file system partition may be well-known for a given file system.

At flowchart decision block 1108, in one or more of the various embodiments, file system engines may be arranged to if there may be protection groups to move to the new partition, control may flow to flowchart block 1104; otherwise, control may flow to flowchart block 1110.

In one or more of the various embodiments, file system engines may be arranged to apply the new erasure code specification to protection groups rather than to individual block stores. Accordingly, in some embodiments, file system engines may be arranged to move the block stores associated with the same protection group to the new partition. Thus, in some embodiments, if the new partition has room for at least one protection group, file system engines may begin moving block stores for the at least one protection group to the new partition.

Further, in some embodiments, file system engines may be configured to defer moving block stores until there may be enough room in the new partition to hold two or more protection groups rather than one protection group. For example, in some embodiments, a file system engine may be configured to move protection groups in groups of five, or the like, rather than being limited to moving one at a time. Generally, the determination of how many protection groups to move at a time may depend on file system policies, system resource/bandwidth allocation, priority determinations, emergencies, or the like. Accordingly, in one or more of the various embodiments, file system engines may be arranged to move and transcode data associated with a protection group to the new partition if it may be considered feasible and safe. For example, there must be sufficient space in the new partition and the file system must be able guarantee that configured data protection levels will be met after the move.

At flowchart block 1110, in one or more of the various embodiments, file system engines may be arranged to determine one or more block stores associated with a protection group.

In one or more of the various embodiments, each protection group may be associated with a number of block stores. For example, if protection groups in a file system are configured to be 100 GB and block stores are configured to be 1 GB, there may be 100 block stores per protection group.

In some embodiments, block stores for a protection group may be distributed throughout the 'old' partition in the file system. Accordingly, in some embodiments, file system engines may be arranged to determine block stores that are stored in storage nodes or storage devices across the file system even though the block stores are associated with the same protection group.

At flowchart block 1112, in one or more of the various embodiments, file system engines may be arranged to transcode and move block stores to the cleared partition.

In one or more of the various embodiments, file system engines may be arranged to apply the new erasure code specification to each protection group. Accordingly, in some embodiments, file system engines may generate new protection groups that use the new erasure code specification and new block store size by designating a new protection group in the new partition such that data moved from the old protection groups is transcoded and stored in the new protection group using block stores with the new block store size. In some embodiments, the operations include identifying the protection group of interest and its associated block stores; transcoding the data from those block stores to conform to the new erasure code specification; storing the transcoded block stores in the new partition.

In some embodiments, transcoding may include updating one or more data structures, indexes, file system tables, or the like, to reflect that the data from the 'old' protection group is located in the new protection group. Accordingly, in some embodiments, if a protection group has been transcoded and moved to the new protection group in the new partition it may be immediately available for client access. From the point of view of the file system clients the transcoding/move operation may be opaque or otherwise unnoticed because it occurs below the level of the client view of the file system.

At flowchart decision block 1114, in one or more of the various embodiments, if there may be more protection groups to transcode and move, control may loop back to flowchart block 1104 or flowchart block 1110; otherwise, control may be returned to a calling process. In some embodiments, if there may be space available in the new partition for more protection groups, control may flow to flowchart block 1110 or if more space needs to be cleared in the new partition, control may flow to flowchart block 1104.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed is:

1. A method for managing data over a network using one or more processors that execute instructions to perform actions, comprising:
   providing a file system that includes a plurality of protection groups that each are associated with a plurality of block stores, wherein each block store associated with the plurality of protection groups is encoded based on a first erasure code and a first block store size;
   storing each of the one or more block stores in one or more of plurality of slots that are defined for separately storing a block store on a different one of a plurality of storage devices that are separately located in the file system;
   dividing the file system into a first partition and a second partition, wherein a portion of a storage space in the file system is shifted from the first partition to the second partition to provide sufficient storage space for one or more of the plurality of protection groups in the second partition based on a specification for a second erasure code, and wherein the first partition is associated with the first erasure code and the second partition is associated with the second erasure code;
   in response to adding one or more additional storage devices to the storage space of the file system, providing additional storage space to the second partition;
   in response to the second partition having sufficient storage space to store one or more of the plurality of protection groups, performing further actions, including:
      determining one or more block stores in the first partition associated with the one or more protection groups;
      transcoding contents of the one or more block stores into one or more other block stores based on the second erasure code and a second block store size, wherein the one or more other block stores are sized based on the second block store size for the second erasure code;
      storing the one or more other block stores in the second partition, wherein the one or more other block stores are stored in one or more of plurality of slots that are defined for separately storing the one or more other block stores on different storage devices that are separately located in the file system;
      deleting the one or more block stores from the first partition; and
      shifting another portion of the storage space from the first partition to the second partition, wherein the shifted other portion increases a size of the second partition to provide sufficient storage space for one or more other protection groups and the first partition is decreased in size based on the deletion of the one or more block stores; and
   in response to the second partition reaching a maximum size, reporting that the file system is encoded based on the second erasure code.

2. The method of claim 1, further comprising:
   providing one or more client requests to the file system; and
   satisfying the one or more client requests using contents from one or more of the first partition or the second partition.

3. The method of claim 1, further comprising:
   moving a portion of plurality of the block stores in the first partition to provide storage space for the second partition.

4. The method of claim 1, further comprising:
   in response to one or more storage devices being added to the file system, distributing a portion of the plurality of block stores to the one or more added storage devices to provide working space in the file system to transcode the plurality of block stores based on the second erasure code.

5. The method of claim 1, wherein transcoding the contents of the one or more block stores into one or more other block stores, further comprises:
   disassociating the one or more block stores from the one or more protection groups; and
   associating the one or more other block stores with the one or more protection groups, wherein a storage capacity, protection level, and availability of each of the one or more protection groups remains unchanged.

6. The method of claim 1, further comprising:
   in response to modifying the file system with one or more additional storage devices, performing additional actions, including:
      determining a storage inefficiency value for the modified file system based on the first erasure code;
      determining a data loss risk value for the modified file system based on the first erasure code; and
      in response to one or more of the storage inefficiency value or the data loss risk value exceeding a threshold value, converting the modified file system to protect its contents based on the second erasure code.

7. A system for managing data comprising:
   a network computer, comprising:
      a memory that stores at least instructions; and
      one or more processors that execute instructions that are configured to cause performance of actions, including:
         providing a file system that includes a plurality of protection groups that each are associated with a plurality of block stores, wherein each block store associated with the plurality of protection groups is encoded based on a first erasure code and a first block store size;
         storing each of the one or more block stores in one or more of plurality of slots that are defined for separately storing a block store on a different one of a plurality of storage devices that are separately located in the file system;
         dividing the file system into a first partition and a second partition, wherein a portion of a storage space in the file system is shifted from the first partition to the second partition to provide sufficient storage space for one or more of the plurality of protection groups in the second partition based on a specification for a second erasure code, and wherein the first partition is associated with the first erasure code and the second partition is associated with the second erasure code;

in response to adding one or more additional storage devices to the storage space of the file system, providing additional storage space to the second partition;

in response to the second partition having sufficient storage space to store one or more of the plurality of protection groups, performing further actions, including:

determining one or more block stores in the first partition associated with the one or more protection groups;

transcoding contents of the one or more block stores into one or more other block stores based on the second erasure code and a second block store size, wherein the one or more other block stores are sized based on the second block store size for the second erasure code;

storing the one or more other block stores in the second partition, wherein the one or more other block stores are stored in one or more of plurality of slots that are defined for separately storing the one or more other block stores on different storage devices that are separately located in the file system;

deleting the one or more block stores from the first partition; and shifting another portion of the storage space from the first partition to the second partition, wherein the shifted other portion increases a size of the second partition to provide sufficient storage space for one or more other protection groups and the first partition is decreased in size based on the deletion of the one or more block stores; and in response to the second partition reaching a maximum size, reporting that the file system is encoded based on the second erasure code; and a client computer, comprising:
a memory that stores at least instructions; and
one or more processors that execute instructions that are configured to cause performance of actions, including, providing one or more of one or more client requests or information associated with the second erasure code.

8. The system of claim 7, wherein the one or more network computer processors execute instructions that perform actions, further comprising:
providing one or more client requests to the file system; and
satisfying the one or more client requests using contents from one or more of the first partition or the second partition.

9. The system of claim 7, wherein the one or more network computer processors execute instructions that perform actions, further comprising:
moving a portion of plurality of the block stores in the first partition to provide storage space for the second partition.

10. The system of claim 7, wherein the one or more network computer processors execute instructions that perform actions, further comprising:
in response to one or more storage devices being added to the file system, distributing a portion of the plurality of block stores to the one or more added storage devices to provide working space in the file system to transcode the plurality of block stores based on the second erasure code.

11. The system of claim 7, wherein transcoding the contents of the one or more block stores into one or more other block stores, further comprises:
disassociating the one or more block stores from the one or more protection groups; and
associating the one or more other block stores with the one or more protection groups, wherein a storage capacity, protection level, and availability of each of the one or more protection groups remains unchanged.

12. The system of claim 7, wherein the one or more network computer processors execute instructions that perform actions, further comprising:
in response to modifying the file system with one or more additional storage devices, performing additional actions, including:
determining a storage inefficiency value for the modified file system based on the first erasure code;
determining a data loss risk value for the modified file system based on the first erasure code; and
in response to one or more of the storage inefficiency value or the data loss risk value exceeding a threshold value, converting the modified file system to protect its contents based on the second erasure code.

13. A processor readable non-transitory storage media that includes instructions that are configured to cause actions for managing data in over a network, wherein execution of the instructions by one or more processors on one or more network computers performs actions, comprising:
providing a file system that includes a plurality of protection groups that each are associated with a plurality of block stores, wherein each block store associated with the plurality of protection groups is encoded based on a first erasure code and a first block store size;

storing each of the one or more block stores in one or more of plurality of slots that are defined for separately storing a block store on a different one of a plurality of storage devices that are separately located in the file system;

dividing the file system into a first partition and a second partition, wherein a portion of a storage space in the file system is shifted from the first partition to the second partition to provide sufficient storage space for one or more of the plurality of protection groups in the second partition based on a specification for a second erasure code, and wherein the first partition is associated with the first erasure code and the second partition is associated with the second erasure code;

in response to adding one or more additional storage devices to the storage space of the file system, providing additional storage space to the second partition;

in response to the second partition having sufficient storage space to store one or more of the plurality of protection groups, performing further actions, including:

determining one or more block stores in the first partition associated with the one or more protection groups;

transcoding contents of the one or more block stores into one or more other block stores based on the second erasure code and a second block store size, wherein the one or more other block stores are sized based on the second block store size for the second erasure code;

storing the one or more other block stores in the second partition, wherein the one or more other block stores are stored in one or more of plurality of slots that are defined for separately storing the one or more other block stores on different storage devices that are separately located in the file system;

deleting the one or more block stores from the first partition; and shifting another portion of the storage space from the first partition to the second partition, wherein the shifted other portion increases a size of the second partition to provide sufficient storage space for one or more other protection groups and the first partition is decreased in size based on the deletion of the one or more block stores; and in response to the second partition reaching a maximum size, reporting that the file system is encoded based on the second erasure code.

14. The media of claim 13, further comprising:
providing one or more client requests to the file system; and
satisfying the one or more client requests using contents from one or more of the first partition or the second partition.

15. The media of claim 13, further comprising:
moving a portion of plurality of the block stores in the first partition to provide storage space for the second partition.

16. The media of claim 13, further comprising:
in response to one or more storage devices being added to the file system, distributing a portion of the plurality of block stores to the one or more added storage devices to provide working space in the file system to transcode the plurality of block stores based on the second erasure code.

17. The media of claim 13, wherein transcoding the contents of the one or more block stores into one or more other block stores, further comprises:
disassociating the one or more block stores from the one or more protection groups; and
associating the one or more other block stores with the one or more protection groups, wherein a storage capacity, protection level, and availability of each of the one or more protection groups remains unchanged.

18. The media of claim 13, further comprising:
in response to modifying the file system with one or more additional storage devices, performing additional actions, including:
determining a storage inefficiency value for the modified file system based on the first erasure code;
determining a data loss risk value for the modified file system based on the first erasure code; and
in response to one or more of the storage inefficiency value or the data loss risk value exceeding a threshold value, converting the modified file system to protect its contents based on the second erasure code.

19. A network computer for managing data, comprising:
a memory that stores at least instructions; and
one or more processors that execute instructions that are configured to cause performance of actions, including:

providing a file system that includes a plurality of protection groups that each are associated with a plurality of block stores, wherein each block store associated with the plurality of protection groups is encoded based on a first erasure code and a first block store size;

storing each of the one or more block stores in one or more of plurality of slots that are defined for separately storing a block store on a different one of a plurality of storage devices that are separately located in the file system;

dividing the file system into a first partition and a second partition, wherein a portion of a storage space in the file system is shifted from the first partition to the second partition to provide sufficient storage space for one or more of the plurality of protection groups in the second partition based on a specification for a second erasure code, and wherein the first partition is associated with the first erasure code and the second partition is associated with the second erasure code;

in response to adding one or more additional storage devices to the storage space of the file system, providing additional storage space to the second partition;

in response to the second partition having sufficient storage space to store one or more of the plurality of protection groups, performing further actions, including:
determining one or more block stores in the first partition associated with the one or more protection groups;

transcoding contents of the one or more block stores into one or more other block stores based on the second erasure code and a second block store size, wherein the one or more other block stores are sized based on the second block store size for the second erasure code;

storing the one or more other block stores in the second partition, wherein the one or more other block stores are stored in one or more of plurality of slots that are defined for separately storing the one or more other block stores on different storage devices that are separately located in the file system;

deleting the one or more block stores from the first partition; and shifting another portion of the storage space from the first partition to the second partition, wherein the shifted other portion increases a size of the second partition to provide sufficient storage space for one or more other protection groups and the first partition is decreased in size based on the deletion of the one or more block stores; and in response to the second partition reaching a maximum size, reporting that the file system is encoded based on the second erasure code.

20. The network computer of claim 19, wherein the one or more processors execute instructions that perform actions further comprising:
providing one or more client requests to the file system; and
satisfying the one or more client requests using contents from one or more of the first partition or the second partition.

21. The network computer of claim 19, wherein the one or more processors execute instructions that perform actions further comprising:

moving a portion of plurality of the block stores in the first partition to provide storage space for the second partition.

22. The network computer of claim 19, wherein the one or more processors execute instructions that perform actions further comprising:

in response to one or more storage devices being added to the file system, distributing a portion of the plurality of block stores to the one or more added storage devices to provide working space in the file system to transcode the plurality of block stores based on the second erasure code.

23. The network computer of claim 19, wherein transcoding the contents of the one or more block stores into one or more other block stores, further comprises:

disassociating the one or more block stores from the one or more protection groups; and associating the one or more other block stores with the one or more protection groups, wherein a storage capacity, protection level, and availability of each of the one or more protection groups remains unchanged.

24. The network computer of claim 19, wherein the one or more processors execute instructions that perform actions further comprising:

in response to modifying the file system with one or more additional storage devices, performing additional actions, including:

determining a storage inefficiency value for the modified file system based on the first erasure code;

determining a data loss risk value for the modified file system based on the first erasure code; and in response to one or more of the storage inefficiency value or the data loss risk value exceeding a threshold value, converting the modified file system to protect its contents based on the second erasure code.

\* \* \* \* \*